(12) United States Patent
Kondo et al.

(10) Patent No.: US 11,156,844 B2
(45) Date of Patent: Oct. 26, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Akane Kondo, Tokyo (JP); Tomoya Narita, Kanagawa (JP); Ryo Fukazawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/956,017

(22) PCT Filed: Dec. 12, 2018

(86) PCT No.: PCT/JP2018/045731
§ 371 (c)(1),
(2) Date: Jun. 19, 2020

(87) PCT Pub. No.: WO2019/131143
PCT Pub. Date: Jul. 4, 2019

(65) Prior Publication Data
US 2020/0319472 A1 Oct. 8, 2020

(30) Foreign Application Priority Data
Dec. 27, 2017 (JP) .............................. JP2017-251435

(51) Int. Cl.
*G02B 27/01* (2006.01)
*G06T 19/00* (2011.01)

(52) U.S. Cl.
CPC ..... *G02B 27/0179* (2013.01); *G02B 27/0172* (2013.01); *G06T 19/006* (2013.01);
(Continued)

(58) Field of Classification Search
CPC ............ G02B 27/0179; G02B 27/0172; G02B 27/0138; G02B 27/017; G02B 2027/0141;
(Continued)

(56) References Cited

U.S. PATENT DOCUMENTS

2015/0094142 A1* 4/2015 Stafford .................. G06F 3/017
463/31
2015/0331236 A1* 11/2015 Roth .................. G08G 1/09623
348/48

(Continued)

FOREIGN PATENT DOCUMENTS

| JP | 2013-235367 A | 11/2013 |
| JP | 2014-191718 A | 10/2014 |

(Continued)

*Primary Examiner* — Alexander Eisen
*Assistant Examiner* — Kebede T Teshome
(74) *Attorney, Agent, or Firm* — Paratus Law Group, PLLC

(57) ABSTRACT

An information processing apparatus according to an embodiment of the present technology includes a setting unit and a display control unit. The setting unit sets a limitation region in which entry is limited. The display control unit controls display of a blocking object that is a virtual object that blocks entry into the limitation region on the basis of a display area in which the virtual object is capable of being displayed. With this configuration, the blocking object can be appropriately displayed, and natural virtual experience can be provided.

18 Claims, 14 Drawing Sheets

(52) U.S. Cl.
CPC .............. *G02B 2027/0138* (2013.01); *G02B 2027/0141* (2013.01); *G02B 2027/0185* (2013.01)

(58) Field of Classification Search
CPC .... G02B 2027/0185; G02B 2027/0167; G02B 2027/0187; G06T 19/006; G06F 3/04815; G06F 3/0304; G06F 3/013; G06F 3/011; G06F 3/012; G06F 1/163; G09G 5/00; G09G 5/36
See application file for complete search history.

(56) References Cited

U.S. PATENT DOCUMENTS

| | | | | |
|---|---|---|---|---|
| 2016/0109940 A1* | 4/2016 | Lyren | ................... | H04W 4/023 463/2 |
| 2019/0051051 A1* | 2/2019 | Kaufman | ................. | G06F 3/01 |

FOREIGN PATENT DOCUMENTS

| | | | |
|---|---|---|---|
| JP | 2015-224981 A | 12/2015 | |
| JP | 2016-138852 A | 8/2016 | |
| WO | WO 2017/180990 A1 | 10/2017 | |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/045731 (filed on Dec. 12, 2018) under 35 U.S.C. § 371, which claims priority to Japanese Patent Application No. 2017-251435 (filed on Dec. 27, 2017), which are all hereby incorporated by reference in their entirety.

TECHNICAL FIELD

The present technology relates to an information processing apparatus, an information processing method, and a program that provide virtual experience.

BACKGROUND ART

Conventionally, a technology of providing a user with virtual experience has been developed. For example, displaying a virtual image in a real space surrounding a user in an overlapping manner enables the user to experience augmented reality (AR). Moreover, for example, displaying a three-dimensional virtual space enables a user to experience virtual reality (VR).

For example, Patent Literature 1 has described a display control apparatus that controls display of a virtual object in an AR space. With the display control apparatus, position and attitude of an actual object are recognized on the basis of an image obtained by capturing an actual space. In accordance with this recognition result, the position and attitude of the virtual object are determined and the virtual object is placed in the AR space. The virtual object placed in the AR space is displayed on a display unit of a see-through head mounted display (HMD), a smartphone, or the like. As a result, a user is enabled to view the virtual object displayed in the actual space in an overlapping manner through the display unit (paragraphs [0017], [0020], [0031], and [0032] in the specification, FIG. 1, and the like of Patent Literature 1).

CITATION LIST

Patent Literature

Patent Literature 1: Japanese Patent Application Laid-open No. 2014-191718

DISCLOSURE OF INVENTION

Technical Problem

The virtual experience using the technologies such as the AR and VR is expected to be applied to various scenes of amusement, education, production sites, and the like for example, and it is desirable to provide a technology capable of providing natural virtual experience.

In view of the above-mentioned circumstances, it is an object of the present technology to provide an information processing apparatus, an information processing method, and a program that are capable of providing natural virtual experience.

Solution to Problem

In order to accomplish the above-mentioned object, an information processing apparatus according to an embodiment of the present technology includes a setting unit and a display control unit.

The setting unit sets a limitation region in which entry is limited.

The display control unit controls display of a blocking object that is a virtual object that blocks entry into the limitation region on the basis of a display area in which the virtual object is capable of being displayed.

In this information processing apparatus, the limitation region in which entry is limited is set and the display of the blocking object that is the virtual object that blocks entry into that limitation region is controlled. The display control of the blocking object is executed on the basis of the display area in which the virtual object is capable of being displayed. With this configuration, the blocking object can be appropriately displayed, and natural virtual experience can be provided.

The display control unit may control the display of the blocking object such that the blocking object falls within the display area.

With this configuration, the blocking object can be appropriately displayed in the display area, and natural virtual experience can be provided.

The information processing apparatus may further include an acquisition unit that acquires information regarding a predetermined target object associated with the limitation region. In this case, the display control unit may control the display of the blocking object, using the predetermined target object as a reference.

With this configuration, the blocking object can be displayed utilizing an object or the like that exists in a space in which a user acts for example, and entry into the limitation region or the like can be naturally prevented.

The display control unit may adjust at least one of a display position or a display size of the blocking object with respect to the predetermined target object on the basis of the display area.

With this configuration, the position, the attitude, or the like of the blocking object can be adjusted in detail for example, and the blocking object can be naturally displayed.

The display control unit may generate a candidate of the blocking object using the predetermined target object as a reference and determine whether or not to display the candidate of the blocking object on the basis of the display area.

With this configuration, a state in which the blocking object is unnaturally displayed can be easily avoided for example, and natural virtual experience can be provided.

The display control unit may determine whether or not to display the candidate of the blocking object by determining whether or not the candidate of the blocking object falls within the display area.

With this configuration, the blocking object can be displayed to fall within the display area for example, and natural virtual experience can be provided.

The acquisition unit may be capable of acquiring information regarding each of a first target object and a second target object spaced apart from each other as the information regarding the predetermined target object. In this case, the display control unit may display the blocking object between the first and second target objects.

For example, the path between the two target objects can be closed using the blocking object. As a result, user's entry can be naturally prevented.

The display control unit may display the blocking object such that the blocking object overlaps the predetermined target object.

By displaying the blocking object overlapping the predetermined target object in this manner, the fact that entry is limited is emphasized, and entry into the limitation region or the like can be sufficiently prevented.

The information processing apparatus may further include a calculation unit that calculates an angle-of-view of a display unit on which the virtual object is displayed as the display area.

With this configuration, the blocking object or the like can be accurately displayed in accordance with the angle-of-view of the display unit for example. As a result, the natural virtual experience using the display unit can be realized.

The display unit may be provided in a head mounted display (HD) that is mounted on a head of a user. In this case, the calculation unit calculates the angle-of-view of the display unit on the basis of at least one of a position or an attitude of the head of the user.

With this configuration, the angle-of-view of the display unit can be precisely calculated, and the blocking object or the like can be accurately displayed.

The display unit may include a see-through display.

The AR experience or the like can be easily provided by using the see-through display.

The display control unit may display the blocking object in accordance with at least one of a position or a movement direction of a user.

With this configuration, the blocking object can be dynamically displayed in accordance with a user's action, and natural virtual experience can be provided while maintaining the degree of freedom of user's action.

The display control unit may display the blocking object that limits entry into the limitation region surrounding the user.

With this configuration, the user can be easily guided for example.

The setting unit may set the limitation region on the basis of at least one of a position or a destination of a user.

With this configuration, the user can be guided to the destination for example, and natural navigation or the like can be realized while maintaining the degree of freedom of user's action.

The setting unit may be capable of setting a limitation level representing a level of limitation on entry into the limitation region. In this case, the display control unit may control the display of the blocking object in accordance with the limitation level.

For example, by setting the entry limitation level as appropriate, virtual experience having a higher degree of freedom of action can be provided without prohibiting user's spontaneous actions and the like.

The information processing apparatus may further include a warning unit that generates warning information for warning of at least one of entry into or approach to the limitation region.

With this configuration, when the user has entered or approached the limitation region, the user can be appropriately informed of the presence of the limitation region for example, and safe virtual experience can be realized.

The warning information may include at least one of sound information, display information, or vibration information.

With this configuration, it is possible to easily inform of entry into or approach to the limitation region.

An information processing method according to an embodiment of the present technology is an information processing method to be executed by a computer system and includes setting a limitation region in which entry is limited. Display of a blocking object that is a virtual object that blocks entry into the limitation region is controlled on the basis of a display area in which the virtual object is capable of being displayed.

A program according to an embodiment of the present technology causes a computer system to execute the following steps.

A step of setting a limitation region in which entry is limited.

A step of controlling display of a blocking object that is a virtual object that blocks entry into the limitation region on the basis of a display area in which the virtual object is capable of being displayed.

Advantageous Effects of Invention

As described above, in accordance with the present technology, the natural virtual experience can be provided. It should be noted that the effects described here are not necessarily limitative and any effect described in the present disclosure may be provided.

MODE(S) FOR CARRYING OUT THE INVENTION

Hereinafter, an embodiment according to the present technology will be described with reference to the drawings.

[Configuration of Information Processing Apparatus]

Figure 1:
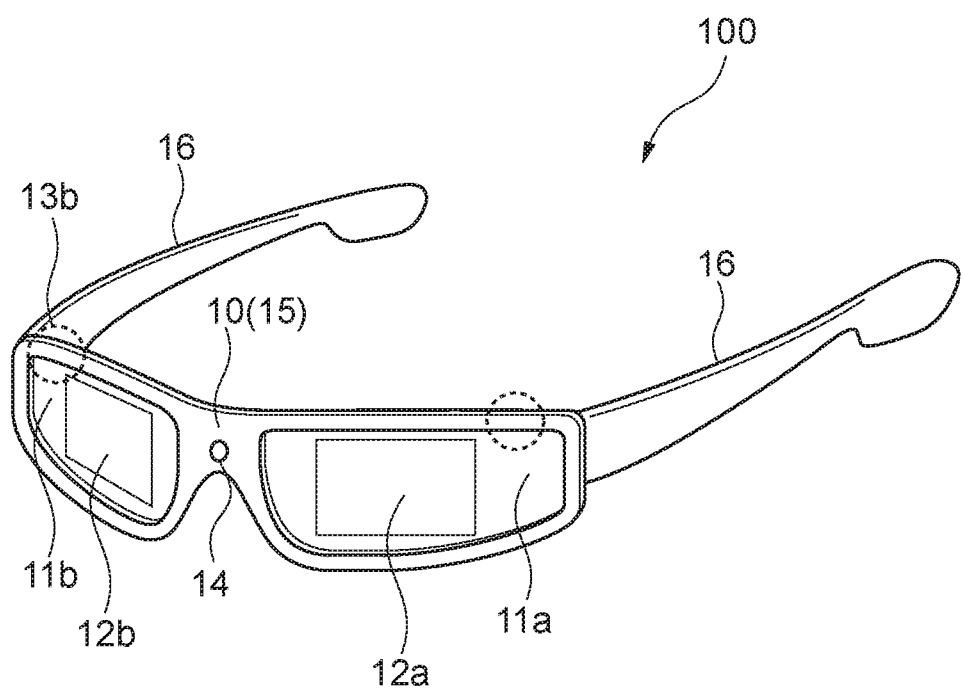
FIG. 1 A perspective view showing an outer appearance of an HMD according to an embodiment of the present technology.

FIG. 1 is a perspective view showing an outer appearance of an HMD according to an embodiment of the present technology. An HMD 100 is an eyeglasses-like apparatus including a see-through display. The HMD 100 is used, mounted on the head of a user. The HMD 100 includes a frame 10, a left-eye lens 11a and a right-eye lens 11b, a left-eye display 12a and a right-eye display 12b, a left-eye camera 13a and a right-eye camera 13b, and an outward-facing camera 14.

The frame 10 has an eyeglasses-like shape and includes a rim portion 15 and temple portions 16. The rim portion 15 is a portion that is placed in front of left and right eyes of a user and supports each of the left-eye lens 11a and the right-eye lens 11b. The temple portions 16 extend rearward toward both ears of the user from both ends of the rim portion 15. Ends of the temple portions 16 fit around the both ears. The rim portion 15 and the temple portions 16 are made of a material such as a synthetic resin and a metal for example.

The left-eye lens 11a and the right-eye lens 11b are respectively placed in front of the left and right eyes of the user to cover at least a part of a visual field of the user. Typically, each lens is designed to correct the eyesight of the user. As a matter of course, the present technology is not limited thereto, and so-called fake eyeglasses may be used.

The left-eye display 12a and the right-eye display 12b are see-through displays and respectively placed to cover partial regions of the left-eye and right-eye lenses 11a and 11b. That is, the left-eye and right-eye lenses 11a and 11b are respectively placed in front of the left and right eyes of the user.

Left-eye and right-eye images or the like are respectively displayed on the left-eye and right-eye displays 12a and 12b. The user wearing the HMD 100 is enabled to visually recognize the real scenery and at the same time visually recognize images displayed on the respective displays 12a and 12b. With this configuration, the user is enabled to experience the augmented reality (AR) and the like.

A virtual displayed object (virtual object) is displayed on each of the displays 12a and 12b for example. For example, computer graphics (CG) of a character and the like, photographs, letters, and the like can be displayed as the virtual object. As a matter of course, the present technology is not limited thereto, and any virtual object may be displayed. In this embodiment, the left-eye and right-eye displays 12a and 12b correspond to a display unit on which the virtual object is displayed.

For example, see-through organic EL displays, liquid-crystal displays (LCD), or the like are used as the left-eye and right-eye displays 12a and 12b. In addition, specific configurations of the left-eye and right-eye displays 12a and 12b are not limited, and for example see-through displays using an arbitrary method such as a method of projecting and displaying images on a transparent screen or a method of displaying images through a prism and the like may be used as appropriate.

The left-eye camera 13a and the right-eye camera 13b are installed as appropriate in the frame 10 to be capable of capturing images of the left eye and the right eye of the user. Line-of-sight information regarding to the line-of-sight of the user and the like are acquired on the basis of the images of the left eye and the right eye captured by the left-eye and right-eye cameras 13a and 13b for example.

Digital cameras each equipped with an image sensor such as a complementary metal-oxide semiconductor (CMOS) sensor and a charge coupled device (CCD) sensor for example are used as the left-eye and right-eye cameras 13a and 13b. Moreover, infrared cameras each installing an infrared light such as an infrared LED for example may be used.

Hereinafter, the left-eye lens 11a and the right-eye lens 11b will be both referred to as lenses 11 and the left-eye display 12a and the right-eye display 12b will be both referred to as see-through displays 12 sometimes. Moreover, the left-eye camera 13a and the right-eye camera 13b will be both referred to as inward-facing cameras 13 sometimes. In this embodiment, the see-through displays 12 correspond to a display unit.

The outward-facing camera 14 is placed in the center of the frame 10 (rim portion 15), facing outward (opposite to the user). The outward-facing camera 14 captures an image of the actual space in the visual field of the user. A digital camera equipped with an image sensor such as a CMOS sensor and a CCD sensor for example is used as the outward-facing camera 14.

Figure 2:
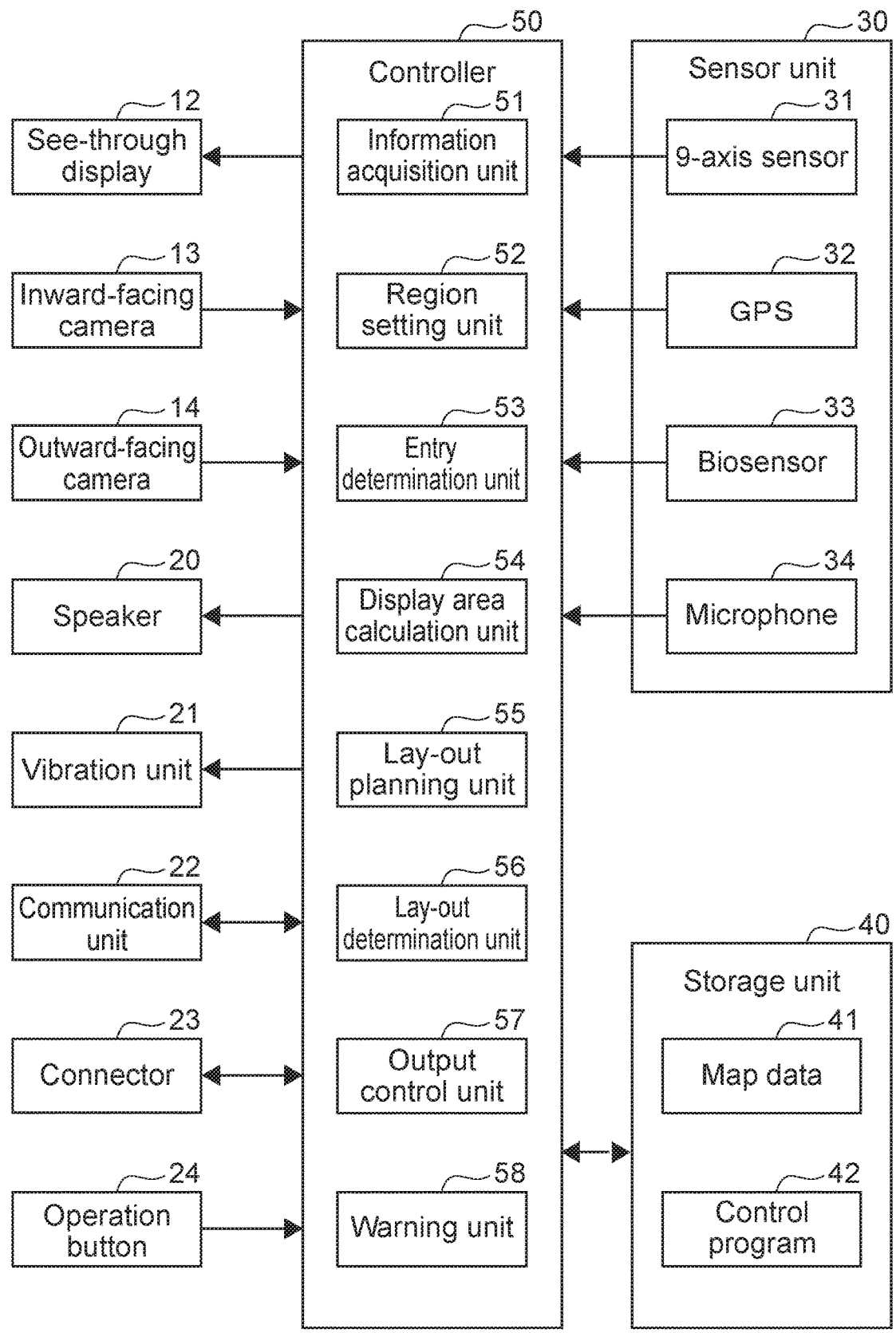
FIG. 2 A block diagram showing a functional configuration example of the HMD shown in FIG. 1.

FIG. 2 is a block diagram showing a functional configuration example of the HMD 100 shown in FIG. 1. As shown in FIG. 2, the HMD 100 further includes a speaker 20, a vibration unit 21, a communication unit 22, a connector 23, an operation button 24, a sensor unit 30, a storage unit 40, and a controller 50.

The speaker 20 is provided at a predetermined position in the frame 10. A configuration of the speaker 20 is not limited, and the speaker 20 capable of outputting stereo sound, mono sound, and the like for example may be used as appropriate. The vibration unit 21 is provided inside the frame 10 and generates vibration. For example, an arbitrary vibration motor or the like capable of generating vibration or the like for notice is used as the vibration unit 21.

The communication unit 22 is a module for performing network communication, near-distance wireless communication, and the like with other devices. For example, a wireless LAN module such as Wi-Fi or a communication module such as Bluetooth (registered trademark) is provided.

The connector 23 is a terminal for connection to other devices. For example, a terminal such as a universal serial bus (USB), a high-definition multimedia interface (HDMI) (registered trademark), or the like is provided. Moreover, upon charge, charging is carried out with the connector 23 connected to a charging terminal of a charging dog (cradle).

The operation button 24 is provided at a predetermined position in the frame 10 for example. The operation button 24 can be used for executing operations related to various functions of the HMD 100 such as a powering on/off operation, functions related to image display and audio output, and a network communication function.

The sensor unit 30 includes a 9-axis sensor 31, a GPS 32, a biosensor 33, and a microphone 34.

The 9-axis sensor 31 includes a 3-axis acceleration sensor, a 3-axis gyro sensor, and a 3-axis compass sensor. The 9-axis sensor 31 can be used for detecting acceleration, angular velocity, and directions of the HMD 100 on the three axes. The GPS 32 acquires information regarding a current location of the HMD 100. Detection results of the 9-axis sensor 31 and the GPS 32 are used for calculating an attitude, a position, and the like of the user for example. Those sensors are provided at predetermined positions in the frame 10 for example.

The biosensor 33 acquires biometric information of the user. For example, a brainwave sensor, an electromyographic (EMG) sensor, a photoplethysmographic (PMG) sensor, a galvanic skin response (GSR) sensor, a temperature sensor, a blood flow sensor, a body motion sensor, and the like are provided as the biosensor 33. Those sensors are provided at predetermined positions in the HMD 100 such that the detection terminal portions are held in contact with predetermined sites of the body for example. Alternatively, the detection terminal portions may be provided, separated from the HMD 100. For example, the brainwave sensor is provided such that the brainwave sensor can be held in contact with a predetermined site of the head. The PMG sensor is provided at a position at which the PMG sensor can be held in contact with blood vessels of the neck.

The microphone 34 detects sound information regarding sound surrounding the user. For example, speech and the like uttered by the user are detected as appropriate. With this configuration, the user can enjoy AR experience while making a voice call or can input an operation into the HMD 100 through audio input for example.

The type of sensor provided as the sensor unit 30 is not limited and an arbitrary sensor may be provided. For example, a temperature sensor, a humidity sensor, and the like capable of measuring temperature, humidity, and the like of an environment where the HMD 100 is used may be provided.

The storage unit 40 is a nonvolatile storage device, and a hard disk drive (HDD), a solid state drive (SSD), and the like for example are used.

Map data 41 is stored in the storage unit 40. The map data 41 is data that functions as a map related to the actual space. In this embodiment, an environmental model is used as the map data 41 including mesh data of the topography of the actual space generated by measuring the actual space and objects, structures, and the like that exist in the actual space. With this configuration, the topography of a space in which the user acts and the forms of objects and buildings that exist in that space for example can be handled as three-dimensional models. A specific configuration of the map data 41 is not limited, and the map data 41 including depth information based on point cloud data and the like, texture information based on an image of the actual space, and the like may be used as appropriate.

Moreover, a control program 42 for controlling overall operations of the HMD 100 is stored in the storage unit 40. A method of installing the map data 41 and the control program 42 into the HMD 100 is not limited.

The controller 50 controls operations of the respective blocks of the HMD 100. The controller 50 includes hardware configurations required for a computer, such as a CPU and memories (RAM, ROM) for example. Various types of processing are executed by the CPU loading the control program 42 stored in the storage unit 40 into the RAM and executing the loaded control program 42.

A device that is a programmable logic device (PLD) such as a field programmable gate array (FPGA), otherwise, an application specific integrated circuit (ASIC), or the like for example may be used as the controller 50.

In this embodiment, an information acquisition unit 51, a region setting unit 52, an entry determination unit 53, a display area calculation unit 54, a lay-out planning unit 55, a lay-out determination unit 56, an output control unit 57, and a warning unit 58 are realized as functional blocks by the CPU of the controller 50 executing a program according to this embodiment. Then, those functional blocks execute an information processing method according to this embodiment. It should be noted that dedicated hardware such as an integrated circuit (IC) may be used as appropriate for realizing the respective functional blocks.

The information acquisition unit 51 reads information required for operations of the respective functional blocks of the controller 50 from the respective units of the HMD 100. For example, the information acquisition unit 51 reads image information captured by the inward-facing cameras 13 and the outward-facing camera 14, detection results of the respective sensors of the sensor unit 30, and the like.

Moreover, the information acquisition unit 51 is capable of reading the map data 41 stored in the storage unit 40 as appropriate. As described above, the map data 41 includes information of three-dimensional models of objects (actual objects) that exist in the actual space or the like. Therefore, it can also be said that the information acquisition unit 51 acquires information regarding the actual objects. In this embodiment, the information acquisition unit 51 corresponds to an acquisition unit.

The display area calculation unit 54 calculates a display area in which a virtual object can be displayed. As described above, the user wearing the HMD 100 visually recognizes the actual space through the see-through displays 12. At this time, a virtual object and the like are displayed with respect to actual objects (objects, structure, and the like in the actual space) included in the scenery visually recognized through the see-through displays 12. In a case where AR-based virtual experience is provided in this manner, it can also be said that an area of the actual space in which the virtual object can be displayed is a display area.

Figure 3:
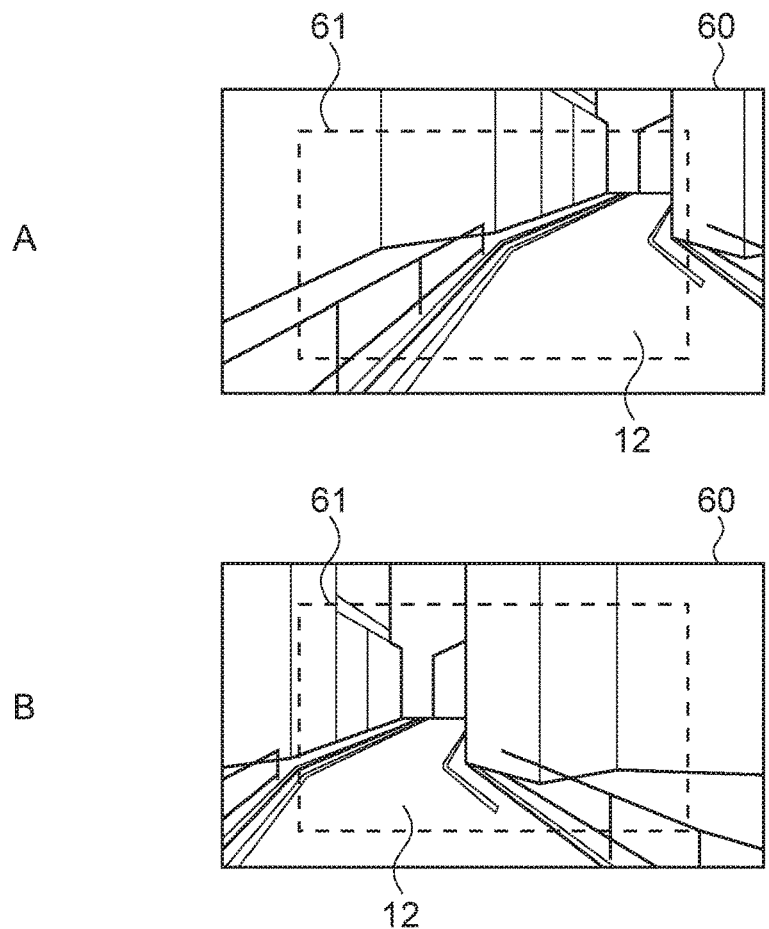
FIG. 3 Schematic diagrams each showing an example of a visual field area of a user wearing the HMD.

FIG. 3 is a schematic diagram showing an example of a visual field area 60 of the user wearing the HMD 100. A and B of FIG. 3 respectively schematically show the scenery (visual field areas 60) visually recognized at different positions. It should be noted that the illustrations of the frame 10, and the lenses 11, and the like of the HMD 100 are omitted from A and B of FIG. 3.

In the HMD 100, each of the see-through displays 12 is placed to overlap a partial region of the visual field area 60 of the user. The region in which the image and the like are displayed by this see-through display 12 is a display area 61 in which the virtual object can be displayed. In each of A and B of FIG. 3, the display area 61 by the see-through display 12 is schematically shown as the dotted lines.

For example, it is assumed that the user who had visually recognized the scenery shown in A of FIG. 3 moved and visually recognizes the scenery shown in B of FIG. 3. At this time, the scenery visually recognized through the see-through display 12, i.e., the area of the actual space that is the display area 61 also changes. Therefore, the display area 61 changes in accordance with the position or attitude of the user (see-through display 12).

Figure 4:
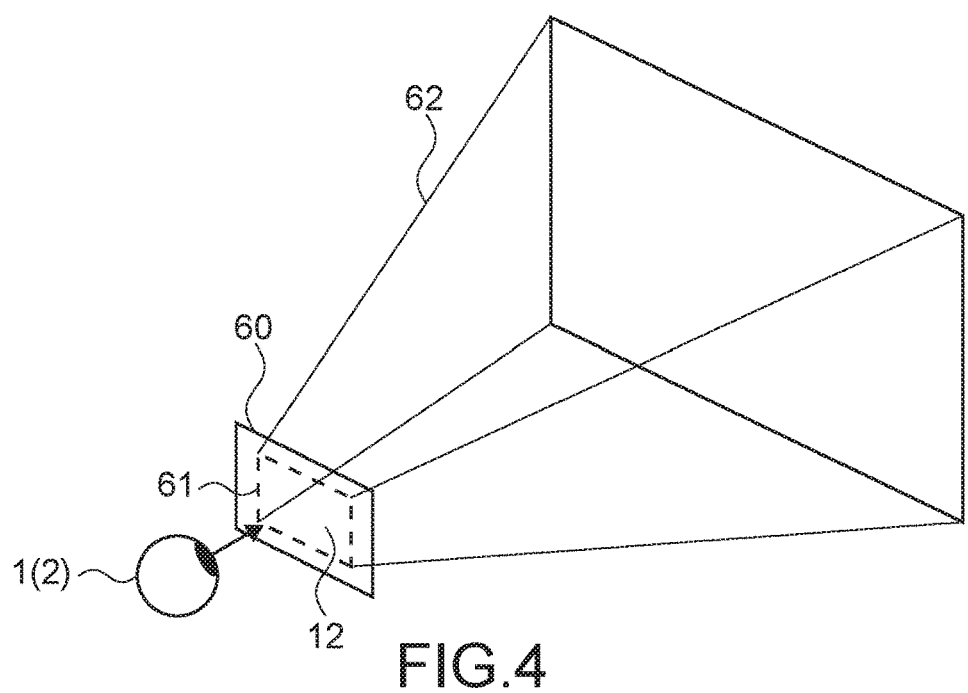
FIG. 4 A schematic diagram for describing an angle-of-view of a see-through display.

In this embodiment, an angle-of-view of the see-through display 12 in which the virtual object is displayed is calculated as the display area 61. FIG. 4 is a schematic diagram for describing the angle-of-view of the see-through display 12. FIG. 4 schematically shows an eyeball 2 of the user 1 wearing the HMD 100 and the see-through display 12 placed in front of the eyeball 2.

An angle-of-view 62 of the see-through display 12 represents an area of the scenery, which comes into the eyeball 2 (retina) of the user 1 through the see-through display 12, as an angle (angle-of-view value). As shown in FIG. 4, the angle-of-view 62 of the see-through display 12 can be expressed as a frustum for example. The frustum is a shape obtained by cutting a square pyramid in parallel with the base to remove a portion including the apex. A plane corresponding to this cut cross-section is a display screen of the see-through display 12.

The actual object included in the angle-of-view 62 of this see-through display 12 is included in the display area 61. With the HMD 100, the angle-of-view 62 of the see-through display 12 can be used for representing the display area 61 in which the virtual object can be displayed in this manner. For example, when the direction of the angle-of-view 62 (frustum) of the see-through display 12 changes, the actual object included therein changes and the scenery in the display area 61 also changes.

The display area calculation unit 54 calculates an angle-of-view 62 on the basis of the position, the attitude, and the angle-of-view value θ of the see-through display 12 in the actual space for example. It should be noted that an angle-of-view value of the see-through display 12 (HMD 100) in the horizontal direction (horizontal angle-of-view), an angle-of-view value of the see-through display 12 (HMD 100) in the vertical direction (vertical angle-of-view), and an angle-of-view value of the see-through display 12 (HMD 100) in the diagonal direction (diagonal angle-of-view), and the like for example are used as the angle-of-view value. With this configuration, the position, the direction, the area, and the like of the scenery that the user 1 visually recognizes through the see-through display 12 can be identified. In this embodiment, the display area calculation unit 54 corresponds to a calculation unit.

The region setting unit 52 sets a limitation region in which entry is limited. The limitation region is set on the actual space in which the user 1 actually moves on the basis of map information (map data 41 and the like) of the actual space for example. The limitation region is set on an area (a path, stairs, a road, a plaza, or the like) in which the user 1 can physically move for example. The area and shape of the limitation region, the number of limitation regions, and the like are not limited, and can be set as appropriate in a manner that depends on a purpose or the like of a service offered to the user 1 for example.

Figure 5:
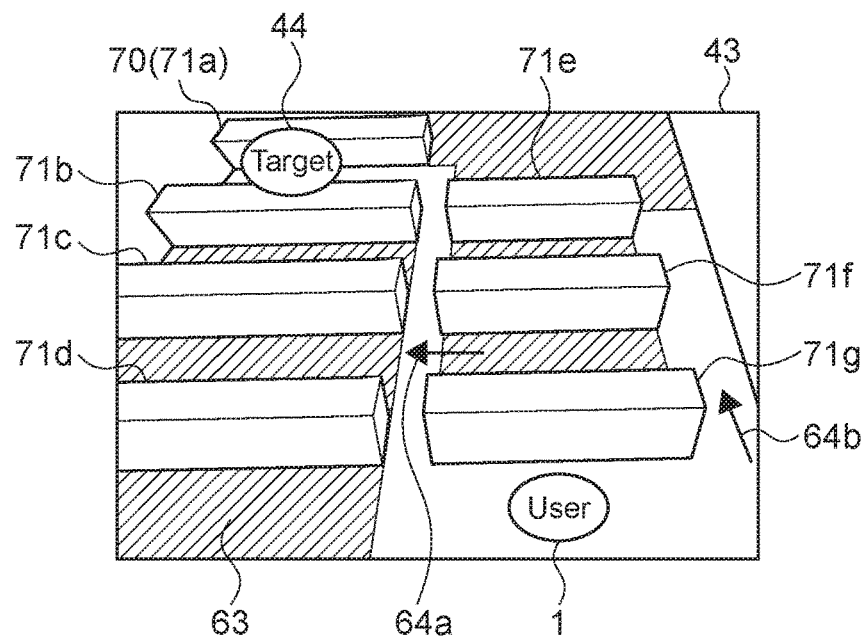
FIG. 5 A schematic diagram showing an example of a limitation region.

FIG. 5 is a schematic diagram showing an example of the limitation region. FIG. 5 schematically shows a region (map 43) divided by actual objects 70 (obstacles 71a to 71g that are desks, partitions, and the like) that exist in the actual space. Limitation regions 63 (hatched regions) are set to paths and the like between those obstacles 71a to 71g. It should be noted that the arrangement, shapes, and the like of respective obstacles 71 are stored in the storage unit 40 as the map data 41.

In this embodiment, the limitation regions 63 are set on the basis of a position of the user 1 and a destination 44. A route on the map data 41 is calculated on the basis of latitude/longitude information of each of a current location of the user 1 and the destination 44 for example. The limitation regions 63 are set as appropriate such that the user 1 can move in accordance with such a route. In the example shown in FIG. 5, the limitation regions 63 are set around a route on which the user 1 moves toward the destination 44.

A method of setting the limitation regions 63 and the like are not limited. The limitation regions may be set as appropriate on the basis of either one of the position of the user 1 or the destination 44 for example. Moreover, the limitation regions 63 can also be set irrespective of the position of the user 1 and the destination 44. For example, processing of specifying in advance a region that the user 1 is desirably forbidden to enter and setting the specified region as a limitation region may be executed.

Moreover, the region setting unit 52 is capable of setting a limitation level representing a level of limitation on entry into the limitation region 63. For example, also when the user 1 has passed the space between the obstacles 71 on the right-hand side of the figure in the region shown in FIG. 5, the user 1 can move toward the destination 44. For the limitation region 63 set on such a space, the limitation level is set to be lower. On the other hand, for a region (dangerous region, off-limits region, or the like) that the user 1 is forbidden to enter for example, the limitation level is set to be higher. In addition, a method of setting the limitation level and the like are not limited.

Referring back to FIG. 2, the entry determination unit 53 determines whether or not the user 1 has entered the limitation region 63. For example, the entry determination unit 53 refers to information regarding the current location of the user 1 (output or the like of the GPS 32 of the HMD 100) as appropriate and determines whether or not the current location of the user 1 is included in the limitation region 63 set by the region setting unit 52. The determination result is output to the warning unit 58 and the like to be described later.

The lay-out planning unit 55 generates a lay-out plan for displaying a blocking object on the see-through display 12. The blocking object set forth herein is a virtual object that block entry into the limitation region 63. Display parameters of a display position, a display size, and the like when displaying the blocking object on the see-through display 12 for example are calculated as the lay-out plan.

The lay-out planning unit 55 selects the limitation region 63 in which the blocking object is displayed on the basis of the position and the movement direction of the user 1, and generates a lay-out plan for displaying the blocking object in that limitation region 63. A method of selecting the limitation region 63 will be described later in detail with reference to FIG. 7 and the like.

In this embodiment, the lay-out plan is generated such that the blocking object is displayed using the actual object 70 as a reference. Specifically, the actual object 70 associated with the limitation region 63 among the actual objects 70 that exist in the actual space is used as a reference for displaying the blocking object (display reference). That is, the display of the blocking object is controlled using the actual object 70 associated with the limitation region 63 as a reference.

Figure 6:
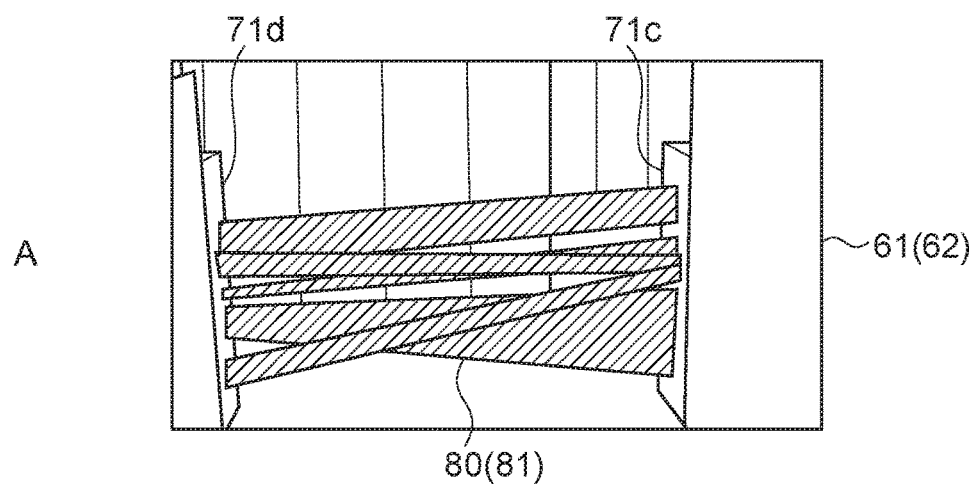
FIG. 6 Schematic diagrams each showing an example of a blocking object displayed using an actual object as a reference.
Figure 6:
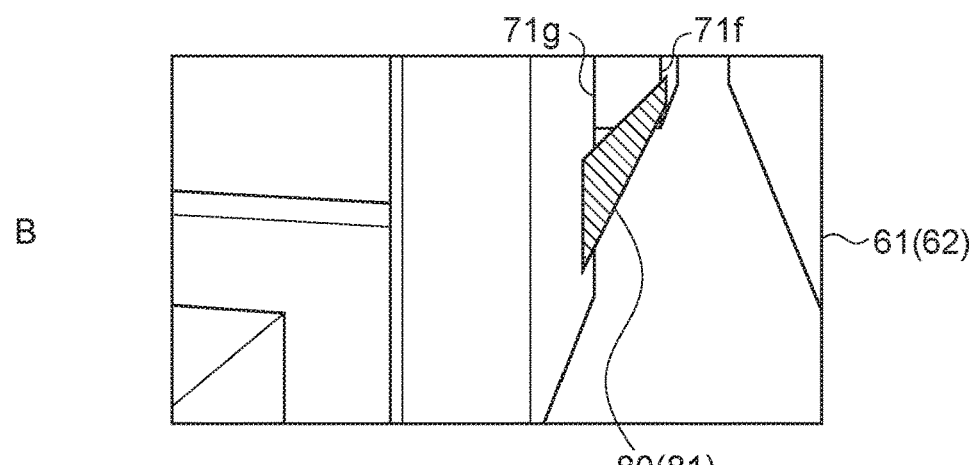

FIG. 6 is a schematic diagram showing an example of the blocking object displayed using the actual object 70 as a reference. Each of A and B of FIG. 6 schematically shows a blocking object 81 that is a virtual object 80 that blocks entry into the limitation region 63. It should be noted that the blocking object 81 shown in each of A and B of FIG. 6 is the blocking object 81 displayed in the angle-of-view 62 of the see-through display 12 (display area 61) directed in a direction indicated by an arrow 64a or 64b shown in FIG. 5.

In the example shown in A of FIG. 6, the limitation region 63 exists in front of the user 1. Moreover, obstacles 71c and 71d exist on both sides of the limitation region 63. In the lay-out plan, coordinates (display positions) or the like of both ends of the tape-like blocking object 81 are calculated using the obstacles 71c and 71d on both sides as display references. In this case, the obstacles 71c and 71d on both sides are actual objects associated with the limitation region 63.

Moreover, in the example shown in B of FIG. 6, the limitation region 63 exists on the left-hand side of a path in front of the user 1. In this case, the obstacles 71f and 71g on both sides of the limitation region 63 on the left-hand side are the actual objects 70 associated with the limitation region 63. Using those obstacles 71f and 71g as display references, a display position or the like of the blocking object 81 is calculated.

A method of setting the actual objects 70 associated with the limitation region 63 (the actual objects that are the display references) and the like are not limited. For example, the actual object 70 that exists around or inside the limitation region 63 and has a size and is located at a position suitable for displaying the blocking object 81 is set as the display reference of the blocking object 81 as appropriate. Moreover, the actual objects 70 or the like that are references for displaying the blocking object 81 may be specified on the map data 41 or the like in advance for example. In this case, the actual object 70 of the specified actual objects 70, which exists around or inside the limitation region 63 included in the angle-of-view 62, is set as the display reference. In this embodiment, the actual object associated with the limitation region 63 corresponds to a predetermined target object associated with the limitation region.

It should be noted that whether the blocking object 81 to be planned to be displayed through the lay-out plan is actually displayed determined by the lay-out determination unit 56. Therefore, it can also be said that the lay-out planning unit 55 generates a candidate of the blocking object 81, using the actual object 70 associated with the limitation region 63 as a reference.

Referring back to FIG. 2, the lay-out determination unit 56 determines whether or not to display the blocking object 81 planned as the lay-out plan on the basis of the angle-of-view 62 of the see-through display 12. That is, the lay-out determination unit 56 determines whether or not to display the candidate of the blocking object 81 on the basis of the display area 61. A method of determining whether or not to display the candidate of the blocking object 81 will be described later in detail.

The output control unit 57 generates an image of the virtual object 80 or the like displayed on the see-through display 12. An image of the candidate of the blocking object 81 is generated on the basis of information (lay-out plan) regarding the candidate of the blocking object 81 determined to be displayed by the lay-out determination unit 56 for example. As a matter of course, an image or the like of another virtual object 80 different from the blocking object 81 can also be generated. Image information that constitutes those images is output to the see-through display 12 as appropriate.

In this manner, the lay-out planning unit 55, the lay-out determination unit 56, and the output control unit 57 control display of the blocking object 81 that blocks entry into the limitation region 63 on the basis of the display area 61. In this embodiment, the lay-out planning unit 55, the lay-out determination unit 56, and the output control unit 57 cooperate to thereby realize a display control unit.

The warning unit 58 generates warning information for warning of entry into or approach to the limitation region 63. For example, the warning unit 58 generates warning information for informing the user 1 of the fact that the user 1 is entering or approaching the limitation region 63 on the basis of a determination result of the entry determination unit 53, a distance between the limitation region 63 and the user 1, and the like. The generated warning information is output to the see-through displays 12, the speaker 20, the vibration unit 21, and the like as appropriate.

Figure 7:
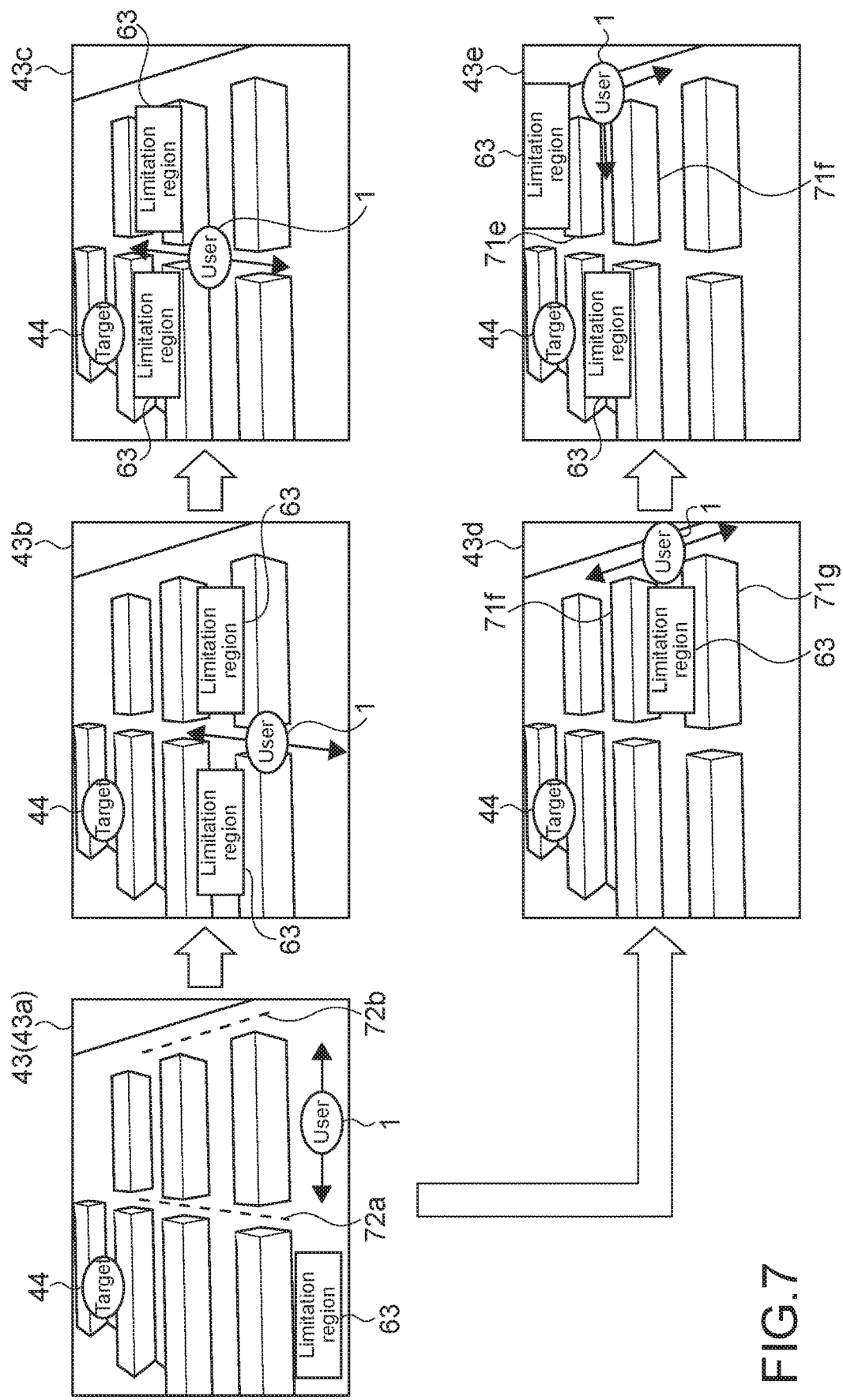
FIG. 7 Schematic diagrams for describing an example of a basic operation of the HMD.

FIG. 7 is a schematic diagram for describing an example of a basic operation of the HMD 100. FIG. 7 schematically shows the limitation region 63 in which the blocking object 81 is displayed when the user 1 moves in the map 43 shown in FIG. 5. Moreover, in FIG. 7, a direction in which the user 1 can move is schematically shown as the arrows.

It is assumed that the user 1 moves from a lower right initial position of the map 43 to the destination 44 at an upper left position of the map 43. In a map 43a, the user 1 is located at the initial position. In a map 43b and a map 43c, the user 1 moves to the destination 44 through a path 72a in the center of the map 43. On the other hand, in a map 43d and a map 43e, the user 1 moves to the destination 44 through a path 72b on the right-hand side of the map 43. It should be noted that in the map 43a, the center path 72a and the right path 72b are schematically shown as the dotted lines.

In this embodiment, the blocking object 81 is displayed in accordance with the position and the movement direction of the user 1. That is, the blocking object 81 is dynamically displayed in accordance with the movement of the user 1. For example, the lay-out planning unit 55 generates the candidate of the blocking object 81 according to the position and the movement direction of the user 1. Then, the blocking object 81 determined to be displayed by the lay-out determination unit 56 is displayed on the see-through display 12.

When the user 1 is located at the initial position as shown in the map 43a, the blocking object 81 is displayed on the limitation region 63 before the user 1 enters the center path 72a. For example, it is assumed that the user 1 moves on the side of the center path 72a (on the left-hand side of the map 43a). At this time, the blocking object 81 is displayed on the limitation region 63 set in front of the user 1. With this configuration, the user 1 can be informed of the fact that the front region is a region into which entry of the user 1 is limited. As a result, the user 1 can be guided to the center path 72a.

When the user 1 enters the center path 72a as shown in the map 43b, the blocking objects 81 are respectively displayed on the limitation regions 63 that exist on the both sides of the center path 72a and are close to the user 1. It should be noted that the limitation regions 63 close to the user 1 are the limitation regions 63 that exist within a predetermined distance from the position of the user 1 for example.

When the user 1 moves on the center path 72a as shown in the map 43c, the blocking objects 81 are displayed on the limitation regions 63 that exist on the both sides of the direction of movement of the user 1. The movement direction of the user 1 is detected on the basis of a change in the position of the user 1 and the like for example. It is possible to easily guide the user 1 to the destination 44 by displaying the blocking object 81 in accordance with the movement direction of the user 1 in this manner.

Moreover, it is assumed that the user 1 moves to the right from the initial position in the map 43a for example. In this case, the limitation region 63 is newly set on the basis of the position of the user 1. For example, a route to go to the destination 44 through the right path 72*b* is generated and the limitation regions 63 are set around the generated route.

When the user 1 enters the right path 72*b* as shown in the map 43*d*, the blocking object 81 is displayed on the limitation region 63 set on one side of the right path 72*b*. It should be noted that there is a wall across the right path 72*b* from the limitation region 63, and the limitation region 63 and the like are not set.

It should be noted that the user 1 can move toward the destination 44 even after the user 1 passes by the limitation region 63 (the space between the obstacles 71*f* and 71*g*) shown in the map 43*d*. The degree to limit entry (limitation level) is set to be lower with respect to such a limitation region 63. For example, when the movement direction of the user 1, the line-of-sight, or the like is oriented to the space between the obstacles 71*f* and 71*g*, the user 1 is permitted to pass therethrough without displaying the blocking object 81.

In this manner, in accordance with the limitation level, display of the blocking object 81 is controlled. For example, with respect to the limitation region 63 whose limitation level is set to be lower, processing of hiding the blocking object 81 in accordance with an action of the user 1 (the movement direction, the line-of-sight, and the like) is executed. In contrast, with respect to the limitation region 63 (dangerous region or the like) whose limitation level is set to be higher, the blocking object 81 is displayed irrespective of the action of the user 1. Such processing may be executed.

When the user 1 moves on the right path 72*b* as shown in the map 43*e*, the blocking object 81 is displayed on the limitation region 63 set at the upper right position of the map 43. As a result, it is possible to prevent the user 1 from entering the upper right limitation region 63 along the right path 72*b*.

It should be noted that on a route set to pass through the right path 72*b*, the space between the obstacles 71*e* and 71*f* is a part of the route. Moreover, the limitation region 63 is set across the space between the obstacles 71*e* and 71*f* from the user 1, and the blocking object 81 is displayed. With this configuration, the user 1 can be informed of the fact that the user 1 can pass through the space between the obstacles 71*e* and 71*f*, and the user 1 can be guided to pass through the space between the obstacles 71*e* and 71*f*.

In this manner, in this embodiment, the blocking object 81 that limits entry of the user 1 into the surrounding limitation region 63 is displayed. With this configuration, the user 1 can be easily guided. Moreover, it can also be said that visualizing the limitation regions 63 by the use of the blocking object 81 is visualizing the area in which in which the user 1 can act. Therefore, the user 1 is enabled to freely move as long as it is an area in which the user 1 can act, and the user 1 can be naturally guided toward the destination 44 while keeping the degree of freedom of action of the user 1.

Moreover, the number of blocking objects 81 to be displayed or the like can be reduced by displaying the blocking object 81 on the surrounding limitation region 63. As a result, the display of the see-through display 12 becomes simple, discomfort and the like to the display of the blocking object 81 (the virtual object 80) can be alleviated, and natural virtual experience can be provided.

Figure 8:
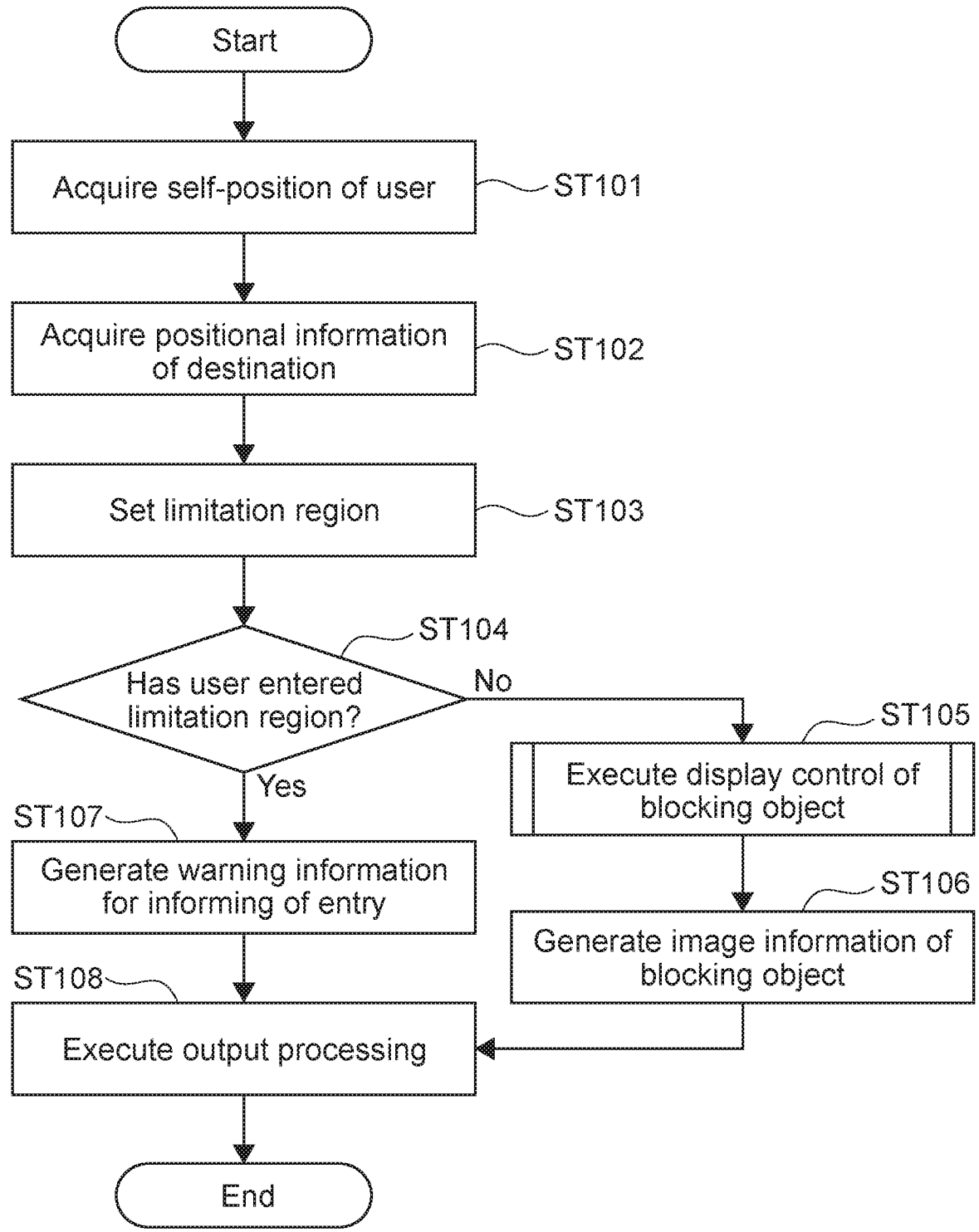
FIG. 8 A flowchart showing an operation example of the HMD.

FIG. 8 is a flowchart showing an operation example of the HMD 100. The processing of the flowchart shown in FIG. 8 is processing to be repeatedly executed during the operation of the HMD 100.

The information acquisition unit 51 acquires a self-position of the user 1 wearing the HMD 100 (Step 101). For example, the latitude and longitude of the HMD 100 detected by the GPS 32 is read as the self-position of the user 1. Moreover, in a case where the user 1 acts in door or the like for example, information regarding the self-position of the user 1 (HMD 100), which is detected using the self-position estimation technology such as simultaneous localization and mapping (SLAM), or the like may be read.

Positional information of the destination 44 is acquired (Step 102). For example, in a case where a service such as navigation is offered through the HMD 100, the latitude and longitude of the destination input by the user 1 or the like are read. Moreover, in a case where a game service or the like in which the actual space is used as a play area is offered, the destination 44 can be changed as the game progresses. In this case, the latitude and longitude of the latest destination 44 are read.

The region setting unit 52 sets the limitation region in which entry of the user 1 is limited (Step 103). For example, a route from the self-position of the user 1 to the destination is calculated and the limitation regions 63 are set around that route (see FIG. 5). At this time, a dangerous region, an off-limits region, and the like specified on the map data 41 or the like in advance are added to the limitation regions 63. By setting the limitation regions 63 in this manner, the user 1 can be safely guided to the destination.

The entry determination unit 53 determines whether or not the user 1 has entered the limitation region 63 (Step 104). The entry determination unit 53 determines whether or not the self-position of the user 1 falls within the limitation region 63. In a case where it is determined that the self-position of the user 1 does not fall within the limitation region 63 (No in Step 104), i.e., in a case where the user 1 has not entered the limitation region 63, the display control on the blocking object 81 is executed (Step 105).

Figure 9:
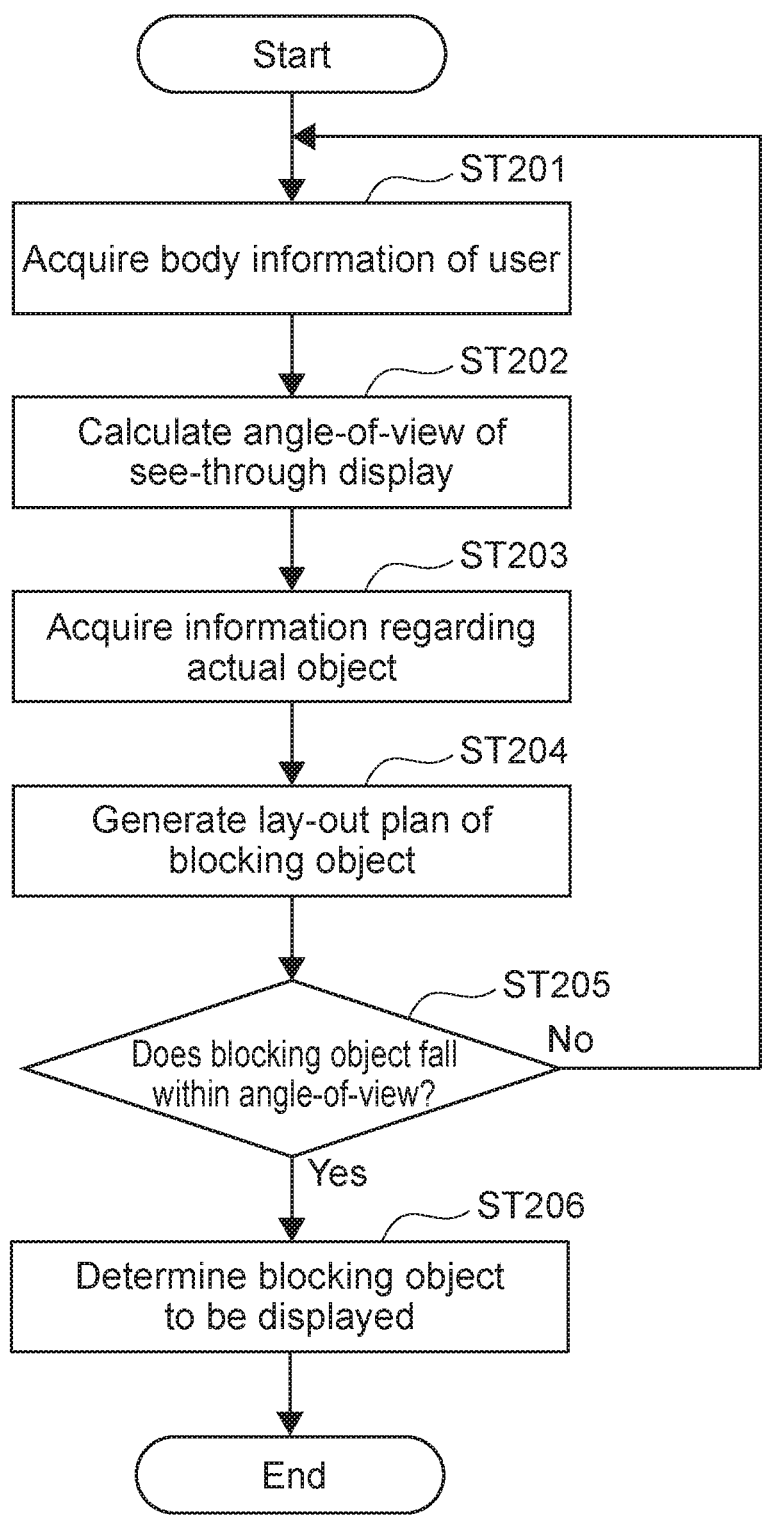
FIG. 9 A flowchart showing an example of display control of blocking object.
Figure 10:
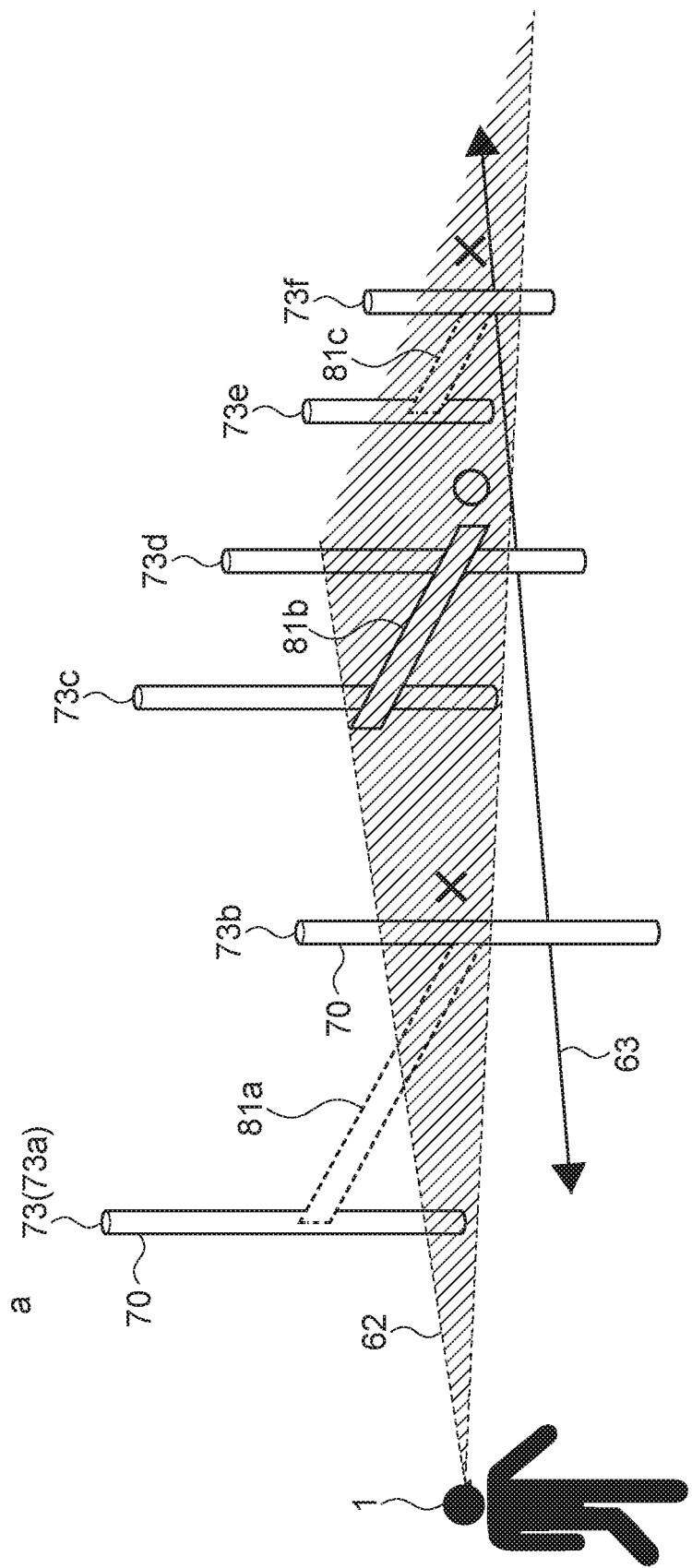
FIG. 10 A schematic diagram for describing an example of the display control of the blocking object.

FIG. 9 is a flowchart showing an example of the display control on the blocking object 81. The flowchart shown in FIG. 9 is an example of the processing performed in Step 105 shown in FIG. 8. FIG. 10 is a schematic diagram for describing an example of the display control on the blocking object 81. Hereinafter, referring to FIGS. 9 and 10, the display control on the blocking object 81 will be described.

As shown in FIG. 9, the body information of the user 1 is first acquired (Step 201). In this embodiment, the body information of the user 1 includes information regarding a position and an attitude of the head of the user 1. The position of the head of the user 1 is three-dimensional coordinates (latitude, longitude, height) of the head of the user 1 in the actual space for example. Moreover, the attitude of the head of the user 1 is indicated as the direction or the like that the user 1 is directed in the actual space for example.

Information regarding a position and an attitude of the HMD 100 mounted on the head of the user 1 in the actual space is typically used as the information regarding the position and the attitude of the head of the user 1. For example, the three-dimensional coordinates of the HMD 100 detected by the GPS 32 or SLAM is used as the position of the head of the user 1. Moreover, the orientation of the HMD 100 detected by the use of the 9-axis sensor 31 or the like for example, i.e., the direction or the like in which the see-through display 12 is oriented is used as the attitude of the head of the user 1.

Moreover, information regarding the movement direction of the user 1, the line-of-sight of the user, and the like is acquired as the body information of the user 1. The movement direction of the user 1 is calculated on the basis of a change in the self-position of the user 1, outputs of the 9-axis sensor 31, and the like for example, and a calculation result is read as appropriate. Moreover, the line-of-sight of the user 1 is detected on the basis of images of the eyeballs 2 of the user 1 taken with the inward-facing cameras 13 and the like for example, and a detection result is read as appropriate.

A specific configuration of the body information of the user 1 is not limited. Moreover, in a case where a method of detecting the body information of the user 1 is not limited to the case of using the respective sensors installed in the HMD 100, and the body information of the user 1 may be detected on the basis of an image of the user 1 taken from behind and the like for example. In this case, body information sent from the outside of the HMD 100 is received via the communication unit 22 and the like. Such processing may be executed.

The display area calculation unit 54 calculates the angle-of-view 62 of the see-through display 12 (Step 202). Specifically, the display area calculation unit 54 calculates an area of the actual space (the display area 61 for the virtual object 80) to be visually recognized via the see-through display 12 on the basis of the position and the attitude of the head of the user 1 (HMD 100) acquired in Step 201 and the angle-of-view value of the see-through display 12 (HMD 100).

A frustum is calculated on the basis of the horizontal angle-of-view and the vertical angle-of-view set in the HMD 100 for example (see FIG. 4). Moreover, a position of the frustum in the actual space, a direction in which the frustum is oriented, or the like is calculated on the basis of the position and the attitude (orientation) of the see-through display 12. In a case of using the frustum, a distance from the see-through display 12 to the base of the frustum, i.e., a depth in the angle-of-view 62 can be set as appropriate. It should be noted that the present technology is not limited to a case where the frustum is used for representing the angle-of-view 62, and an arbitrary method capable of calculating the angle-of-view 62 for example may be used.

Information regarding the actual object 70 that is the reference for displaying the blocking object 81 is acquired (Step 203). For example, the limitation region 63 that exists in the angle-of-view 62 of the see-through display 12 is detected and information regarding the actual object 70 associated with the detected limitation region 63 is read from the map data 41 as appropriate.

In the example shown in FIG. 10, six poles 73a to 73f are shown as an example of the actual object 70 associated with the limitation region 63. Information related to the positions and shapes (three-dimensional model) of those poles 73a to 73f are recorded on the map data 41.

In this embodiment, the information acquisition unit 51 acquires information regarding each of the first actual object 70 and the second actual object 70 spaced apart from each other as the actual object 70 associated with the limitation region 63. For example, in FIG. 10, information regarding a three-dimensional model of a pair of poles 73 of the six poles 73a to 73f is acquired. In this case, the acquired pair of poles 73 is the first and second actual objects 70 respectively. In this embodiment, the first actual object 70 and the second actual object 70 correspond to a first target object and a second target object.

A method of setting the pair of actual objects 70 (pair of poles 73) and the like are not limited. For example, the pair of actual objects 70 that is a reference for displaying the blocking object 81 may be specified on the map data 41 in advance. With this configuration, information regarding the pair of actual objects 70 can be easily read, and the processing load can be reduced. Moreover, processing of setting the pair of actual objects 70 in the order closer to the distance to the user 1 or processing of setting the pair on the basis of a positional relationship between the actual objects 70 for example may be executed.

Hereinafter, it is assumed that a first pair (the pole 73a and the pole 73b), a second pair (the pole 73c and the pole 73d), and a third pair (the pole 73e and the pole 73f) have been recorded on the map data 41. Moreover, it is assumed that in Step 203, information regarding the three-dimensional model of the pair of poles 73 in the order closer to the user 1 is read from the map data 41. Therefore, the information regarding the first pair is read in a first loop.

The lay-out planning unit 55 generates a lay-out plan of the blocking object 81 using the actual object 70 associated with the limitation region 63 as a reference (Step 204). That is, a candidate of the blocking object 81 is generated using the actual object 70 acquired in Step 203 as a reference. Hereinafter, the candidate of the blocking object 81 generated as the lay-out plan will be simply referred to as the blocking object 81 sometimes.

In a case where the pair of actual objects 70 is the reference as shown in FIG. 10 for example, the lay-out plan is generated such that the blocking object 81 is displayed between the respective actual objects. That is, display parameters of the blocking object 81 are calculated such that the blocking object 81 is displayed between the first and second actual objects 70.

In the first loop, a lay-out plan to display a tape-like blocking object 81a between the pole 73a and the pole 73b is generated. For example, the display position and the display size in the see-through displays 12 for displaying the tape-like blocking object 81a in accordance with predetermined positions of the pole 73a and the pole 73b are calculated. It should be noted that a position at which the blocking object 81a is to be displayed in three-dimensional models of the pole 73a and the pole 73b and the like may be specified in advance. With this configuration, the lay-out plan can be easily generated.

The lay-out determination unit 56 determines whether or not the size of the blocking object 81 falls within the angle-of-view 62 of the see-through display 12 (Step 205). By determining whether or not the candidate of the blocking object 81 within the angle-of-view 62 of the see-through display 12 in this embodiment, whether or not to display the candidate of the blocking object 81 is determined.

For example, whether or not coordinates of end portions (four apexes of the tape or the like) of the blocking object 81 generated as the lay-out plan falls within the space represented as the angle-of-view 62 is determined. Moreover, whether or not a percentage of the blocking object 81 falling within the angle-of-view 62 is above a predetermined percentage may be determined. For example, in a case where a predetermined percentage (e.g., 90% or the like) or more of the display area of the blocking object 81 falls within the angle-of-view 62, it is determined that the blocking object 81 falls within the angle-of-view. Such processing may be executed. In addition, a method of determining whether or not the blocking object 81 falls within the angle-of-view 62 and the like are not limited.

As shown in FIG. 10, it is determined that the blocking object 81a between the pole 73a and the pole 73b does not fall within the angle-of-view 62. For example, in a case where the blocking object 81a is displayed using the first pair as a reference, only a part of the blocking object 81a is displayed on the see-through display 12. As a result, the blocking object 81a partly cut off at the end of the see-through display 12 (display area 61) is displayed in the visual field area 60 of the user 1 (see FIG. 3). In this case, it is determined that the blocking object 81a is not to be displayed.

In a case where it is determined that the blocking object 81 does not fall within the angle-of-view 62 (No in Step 205), information regarding a next actual object 70 is, returning to Step 201, acquired and a lay-out plan of the blocking object 81 using the acquired actual object 70 as a reference is generated.

For example, in a second loop, information regarding the second pair that are the pole 73c and the pole 73d read from the map data and a lay-out plan to display a tape-like blocking object 81b between the pole 73c and the pole 73d is generated. Then, whether or not the blocking object 81b falls within the angle-of-view 62 of the see-through display 12 is determined.

As shown in FIG. 10, the blocking object 81b between the pole 73c and the pole 73d falls within the angle-of-view 62. Therefore, in a case where the blocking object 81b is displayed using the second pair as a reference for example, the entire blocking object 81b is displayed on the see-through display 12. In this case, it is determined that the blocking object 81b is to be displayed.

In a case where it is determined that the blocking object 81 falls within the angle-of-view 62 (Yes in Step 205), the output control unit 57 generates image information for displaying the blocking object 81 determined to be displayed on the see-through displays 12 (Step 106 in FIG. 8). Pattern, tone, and the like of the surface of the blocking object 81 are set as appropriate on the basis of the lay-out plan for example, and image information that constitutes the image of the blocking object 81 is generated. The generated image information is output to the see-through displays 12 through the output processing of Step 108 and the blocking object 81 is displayed.

In this manner, the display of the blocking object 81 is controlled such that the blocking object 81 falls within the angle-of-view 62 of the see-through display 12. With this configuration, the situation where the blocking object 81 unnaturally cut off or the like is displayed is avoided, sufficiently natural virtual experience can be provided.

It should be noted that as shown in FIG. 10, a blocking object 81c using the third pair (the pole 73e and the pole 73f) as a reference also falls within the angle-of-view 62 of the see-through display 12. However, it is already possible to display the blocking object 81b between the blocking object 81c and the user 1. Therefore, the display of the blocking object 81c is not executed.

Therefore, the blocking objects 81 can be prevented from being displayed in an overlapping manner. As a result, unnecessary display can be suppressed and simple AR display can be realized. As a result, it is sufficiently avoid the situation where overlapping display of the virtual objects 80 makes it difficult to view the screen.

Figure 11:
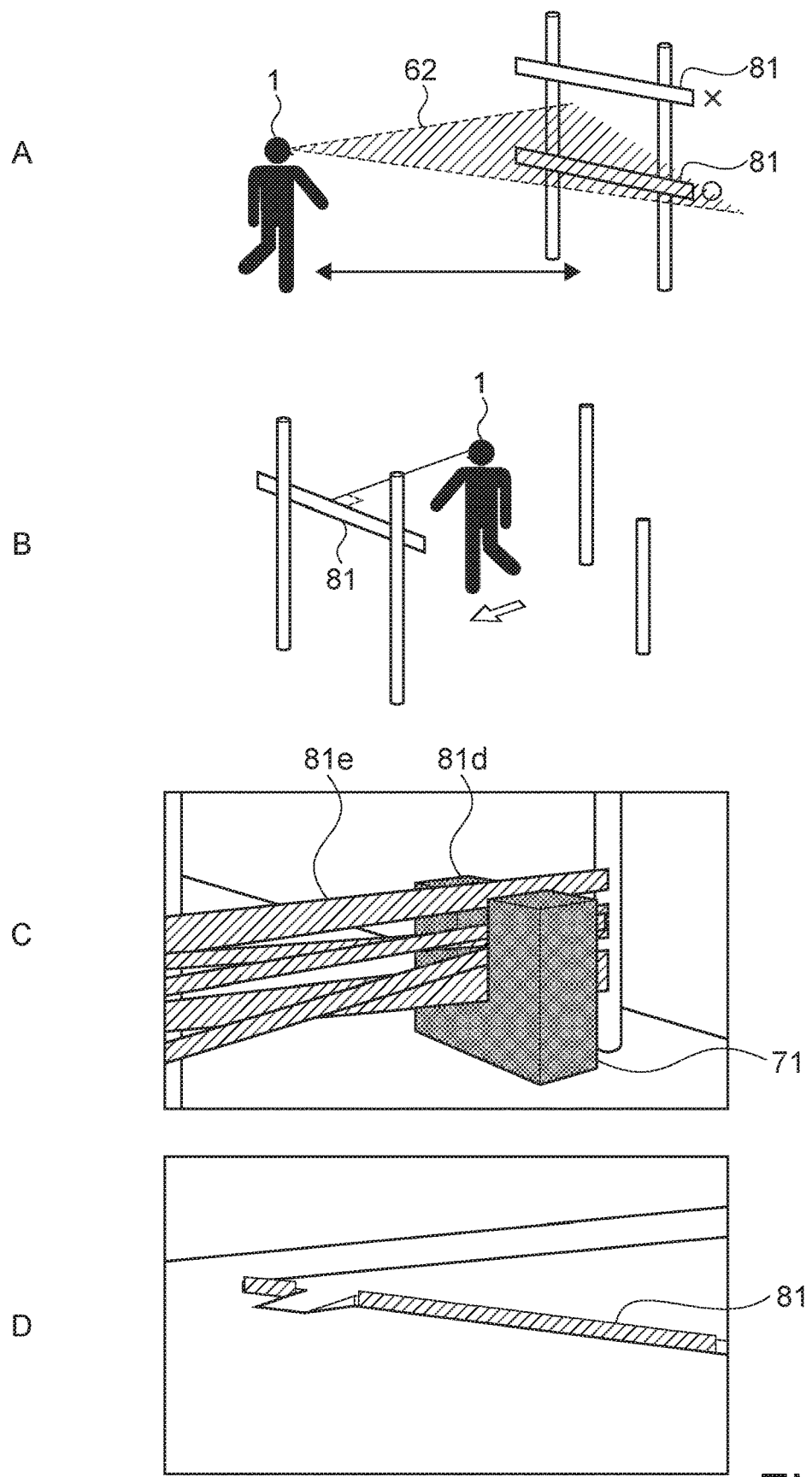
FIG. 11 Schematic diagrams each showing a display example of the blocking object using the actual object as a reference.

FIG. 11 is a schematic diagram showing a display example of the blocking object 81 using the actual objects 70 as a reference. Each of A to D of FIG. 11 schematically shows an example of the blocking object 81 displayed using the actual object 70 as a reference.

In A of FIG. 11, the display position of the blocking object 81 is controlled in accordance to the angle-of-view 62. For example, it is assumed that in the three-dimensional models of the actual objects 70, the display position of the blocking object 81 has been set above the angle-of-view 62. In this case, the lay-out planning unit 55 executes processing of lowering the display position of the blocking object 81 with respect to the actual objects 70 in accordance with the angle-of-view 62 of the see-through display 12.

Moreover, when a distance between the user 1 and the actual objects 70 is long for example, processing of increasing the size of the blocking object 81 with respect to the actual objects 70 to make it easy to view is executed. In this manner, the lay-out planning unit 55 adjusts the display position and the display size of the blocking objects 81 with respect to the actual objects 70 associated with the limitation region 63 on the basis of the angle-of-view 62 of the see-through display 12.

By adjusting the display position and the display size of the blocking object 81 on the basis of the angle-of-view 62 of the see-through display 12, the blocking object 81 can be arranged at a natural position of which the user 1 is easily aware. With this configuration, it is possible to naturally inform of the location where the limitation region 63 and the like.

In B of FIG. 11, the blocking object 81 is statically displayed with respect to the movement direction of the user 1. For example, the tape (the blocking object 81) displayed between the poles 73 is displayed in an enlarged state as appropriate in a manner that depends on approach of the user 1. As a result, the blocking object 81 can be displayed as in the case where the tape is actually attached in the real space.

In C of FIG. 11, the blocking objects 81 are displayed so as to cover the actual object 70. That is, the blocking objects 81 are displayed overlapping the actual object 70. In C of FIG. 11, the obstacles 71 installed between the pair of poles 73 are used as the references for displaying the blocking object 81 in addition to the pair of poles 73. A blocking object 81d in dark color is displayed so as to cover the obstacles 71, using a three-dimensional model representing the shape of the obstacle 71 for example. Moreover, a tape-like blocking object 81e is displayed such that the tape-like blocking object 81e is shielded by the blocking object 81 in dark color.

By displaying the blocking object 81d having a shape similar to that of the real obstacle 71 in dark color in this manner, the tape-like blocking object 81 can be displayed such that the tape-like blocking object 81 is shielded by the real obstacle 71. With this configuration, display easily adapted for the real world can be realized. Moreover, the user 1 can be informed of the fact that entry is limited by both of the real obstacle 71 and the blocking object 81e, and entry into the limitation region 63 can be sufficiently limited.

In D of FIG. 11, the blocking object 81 is displayed on a step in the actual space. The step or the like is detected as the actual object 70 on the basis of a three-dimensional model of the topography or the like in the map data 41 for example. For example, there is a fear that a drop, fall, or and the like may occur in a region in which the height of a walking plane changes, that region is set as the limitation region 63.

In this manner, the limitation region 63 may be set in accordance with the topography of the actual space or the like. A method of setting the limitation region 63 in accordance with the topography or the like is not limited, and the limitation region 63 may be set also with respect to a region whose depth is significantly large (depth difference is large) for example. With this configuration, the blocking object 81 can be displayed in accordance with the topography where the user 1 moves, and safe virtual experience can be provided.

Referring back to FIG. 8, in a case where it is determined that the user 1 has entered the limitation region 63 (Yes in Step 104), the warning unit 58 generates warning information for informing of entry into the limitation region 63 (Step 107).

Figure 12:
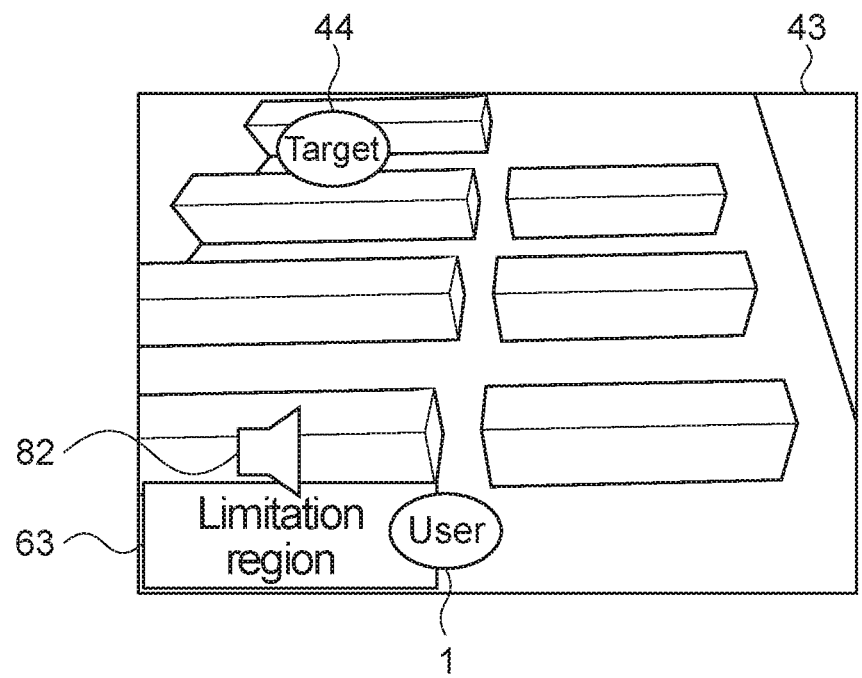
FIG. 12 A schematic diagram for describing an operation example of a warning unit.

FIG. 12 is a schematic diagram for describing an operation example of the warning unit 58. In the example shown in FIG. 12, sound information is generated as the warning information. For example, when the user 1 enters the limitation region 63 set in the map 43, sound information or the like for reproducing buzzer sound, alarm sound, or the like as 2D sound is generated. The 2D sound set forth herein is sound reproduced with constant sound volume for example. Therefore, buzzer sound or the like is output with constant sound volume while the user 1 stays in the limitation region 63.

Moreover, when entering the limitation region 63 for example, processing of lowering the sound volume of BGM may be executed. In this case, sound information for reproducing BGM with the sound volume reduced in comparison with that before entering the limitation region 63 is generated. By performing acoustic feedback using unpleasant sound or uncomfortable sound in this manner, the user 1 can be easily informed of entry into the limitation region 63.

It is also possible to warning of entry into the limitation region 63 through the see-through displays 12. For example, display information or the like for blinking the display of the see-through displays 12 is generated as the warning information. Moreover, display information or the like for displaying a region or the like in predetermined color in peripheries of the see-through displays 12 (in outer peripheries of the display screen) may be generated. By performing unnatural display on the see-through displays 12 in this manner, the user 1 can be easily informed of entry into the limitation region 63.

Oscillation such as vibration may be generated to warn of entry into the limitation region 63. In this case, vibration information or the like for vibrating the vibration unit 21 in a predetermined pattern is generated as the warning information. A specific configuration of the warning information is not limited, and each of the sound information, the display information, and the vibration information may be generated alone for example. As a matter of course, warning information obtained by combining them may be generated as appropriate.

With this configuration, in a case where entry into the limitation region 63 is determined that, unpleasant expression using sound, display, vibration, and/or the like can be presented. As a result, the user 1 can be informed of entry into the limitation region 63 and the user 1 can be guided to move out of the limitation region 63. That is, the action of the user 1 can be controlled to prevent the user 1 from remaining in the limitation region 63.

It should be noted that the warning unit 58 is capable of generating the warning information for informing of approach to the limitation region 63. The warning information for informing of approach may be generated irrespective of whether or not the user 1 has entered the limitation region 63. For example, a virtual sound source 82 is placed in the limitation region 63 set in the map 43 shown in FIG. 12. The warning unit 58 generates sound information that enables 3D sound, whose sound volume is controlled in accordance with the distance between the virtual sound source 82 and the user 1, to be reproduced.

For example, the 3D sound is set such that the sound volume increases as the user 1 approaches the virtual sound source 82. With this configuration, the user 1 can be informed of approach to the limitation region 63 before the user 1 enters the limitation region 63. Such processing may be executed.

The generated warning information is output to the respective units of the HMD 100 as appropriate through the output processing in Step 108 in FIG. 8. For example, the sound information is output to the speaker 20 and buzzer sound or the like is reproduced. Moreover, the display information is output to the see-through displays 12 and display to blink or the like is performed. Moreover, the vibration information is output to the vibration unit 21 and an operation of generating oscillation such as vibration is performed.

In this manner, with the HMD 100, feedback processing to the user 1 is executed in accordance with the position of the user 1. That is, when the user 1 is located in the play area in which the user 1 can act, the blocking object 81 for informing of the limitation region 63 may be displayed as appropriate as the feedback processing. Moreover, when the user 1 departs from the play area and enters the limitation region 63, various unpleasant expressions are presented as the feedback processing. With this configuration, the user 1 can be naturally guided such that the user 1 moves in the play area while maintaining the degree of freedom of action of the user 1.

FIGS. 13 to 20 are schematic diagrams each showing a display example of the blocking object 81. Each of FIGS. 13 to 20 schematically shows the visual field area 60 of the user 1 wearing the HMD 100 and the display area 61 for the virtual object 80. Hereinafter, the blocking object 81 displayed on the see-through display 12 when the user 1 moves in the actual space will be described with reference to FIGS. 13 to 20.

Figure 13:
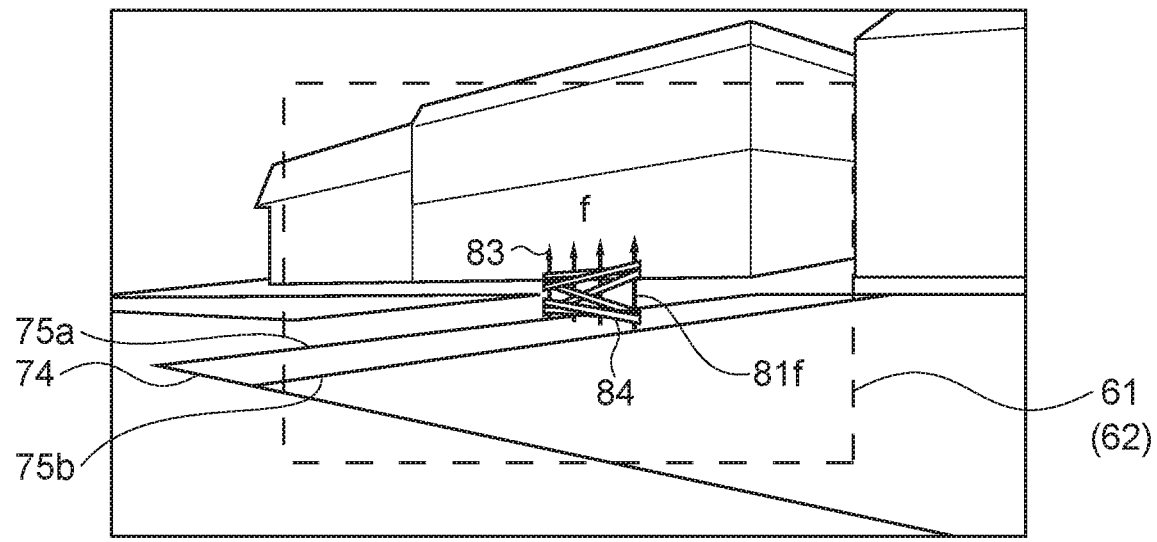
FIG. 13 A schematic diagram showing a display example of the blocking object.

In FIG. 13, a blocking object 81f including four fence posts 83 and a tape 84 put on the four fence posts 83 is displayed. Using boundary portions 75a and 75b of a sidewalk 74 as references, the blocking object 81 is displayed to shield the sidewalk 74. Therefore, in the example shown in FIG. 13, the boundary portions 75a and 75b of the sidewalk 74 are the actual objects 70 (the actual objects 70 associated with the limitation region 63) that are display references of the blocking object 81.

In FIG. 13, the blocking object 81 is displayed in the substantially center of the display area 61 (the angle-of-view 62 of the see-through display 12). With this configuration, forward movement of the user 1 can be blocked. It should be noted that at this time, the user 1 has not yet decided to move in the left or right-hand direction.

Figure 14:
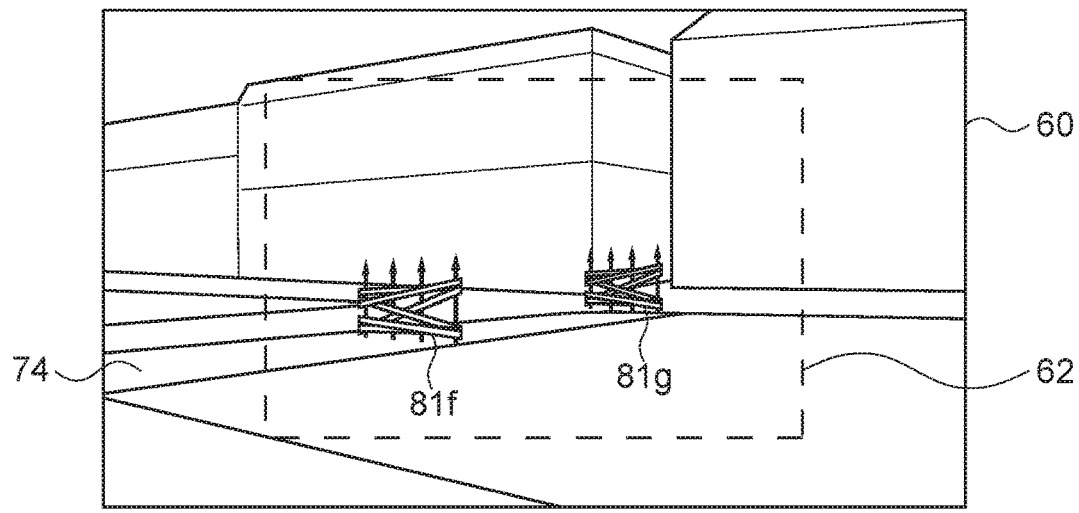
FIG. 14 A schematic diagram showing a display example of the blocking object.

When the user 1 moves the line-of-sight from the visual field area 60 of FIG. 13 to the right as shown in FIG. 14, another blocking object 81g is displayed behind the blocking object 81f. With this configuration, movement of the user 1 behind the blocking object 81f to the right is blocked and the user 1 is guided to the left of the screen. It should be noted that the display of the blocking object 81f displayed in FIG. 13 is maintained.

Figure 15:
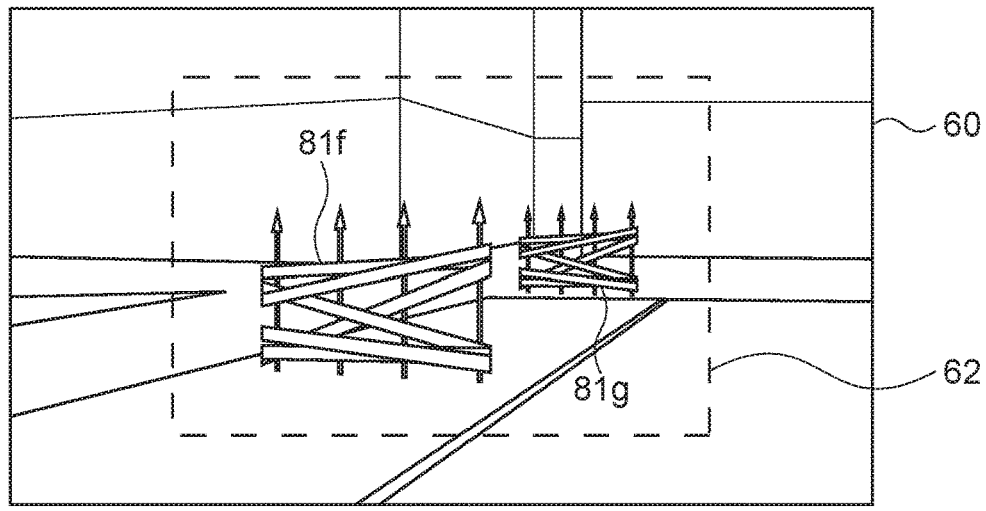
FIG. 15 A schematic diagram showing a display example of the blocking object.

In FIG. 15, the user 1 approaches the sidewalk 74 on which the blocking objects 81f and 81g are displayed. At this time, the blocking objects 81f and 81g are placed to shield the sidewalk 74. Therefore, the user 1 can be informed of the fact that forward movement along the sidewalk 74 is strictly limited.

Figure 16:
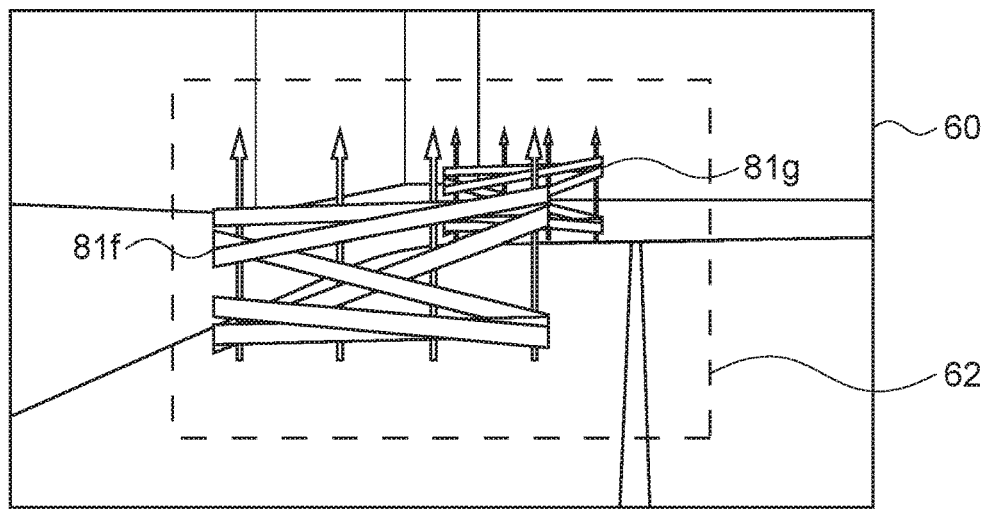
FIG. 16 A schematic diagram showing a display example of the blocking object.

In FIG. 16, the user 1 moves in front of the blocking object 81f. As a result, the blocking object 81f and the blocking object 81g are displayed in an overlapping manner. Processing of continuously displaying the blocking object 81 already displayed also when the blocking objects 81 overlap each other in this manner may be executed.

Moreover, in a case where it is determined that the blocking object 81*f* and the blocking object 81*g* overlap each other for example, processing of displaying the front blocking object 81*f* and hiding the back blocking object 81*g* may be executed. In contrast, processing of displaying the back blocking object 81*g* and hiding the front blocking object 81*f* may be executed. With this configuration, simple AR display can be realized.

Figure 17:
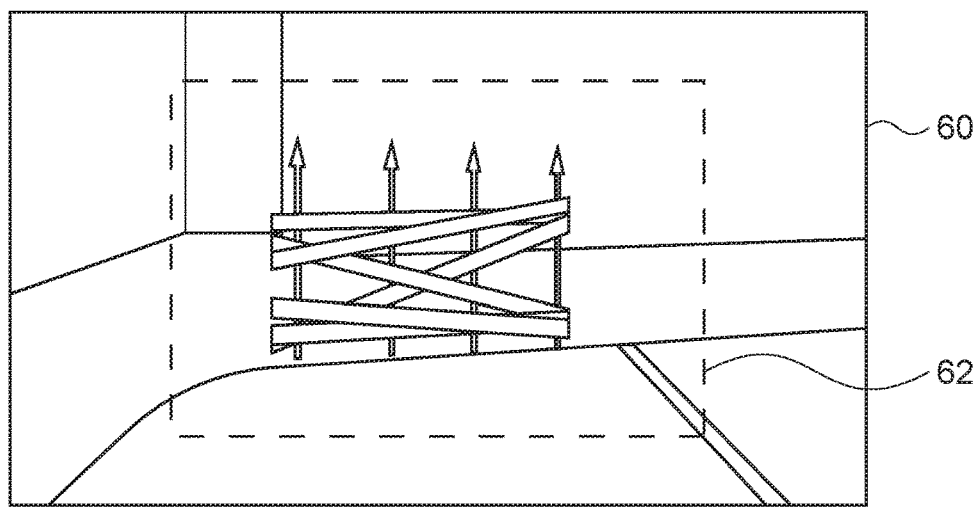
FIG. 17 A schematic diagram showing a display example of the blocking object.

In FIG. 17, the user 1 moves forward over the front blocking object 81*f*. In this case, only the back blocking object 81*g* is displayed on the see-through displays 12. Moreover, in a case where the region between the blocking objects 81*f* and 81*g* is set as the limitation region 63, unpleasant expression such as buzzer sound is presented. With this configuration, the user 1 can be informed of the fact that the user 1 has entered the limitation region 63.

It should be noted that for instance in a case where only the blocking object 81*f* is displayed in FIG. 16, processing in which the blocking object 81*g* shown in FIG. 17 is newly displayed at a timing when the user 1 moves over the blocking object 81*f* may be executed. With this configuration, the user 1 can be informed of the fact that entry into the limitation region 63 is strictly limited for example.

Figure 18:
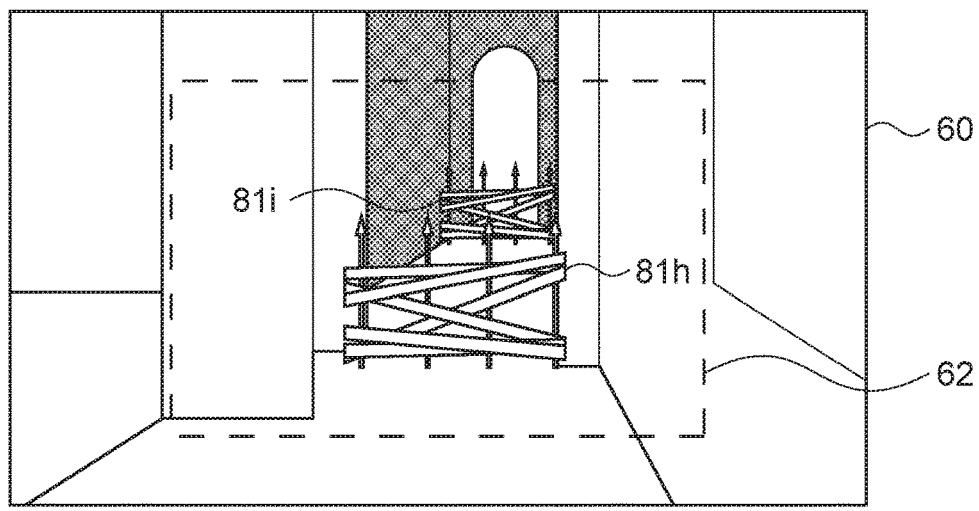
FIG. 18 A schematic diagram showing a display example of the blocking object.

In FIG. 18, blocking objects 81*h* and 81*i* is displayed using the entry and exit of a tunnel-like path as references. With this configuration, it is possible to make a scene that looks as if the tunnel-like path was closed, and it is possible to inform of the fact that entry into the tunnel-like path is strictly limited. As a result, the user 1 can be sufficiently prevented from passing through the tunnel-like path and moving forward. As a matter of course, processing of displaying either one of the blocking object 81*h* or 81*i* may be executed.

Figure 19:
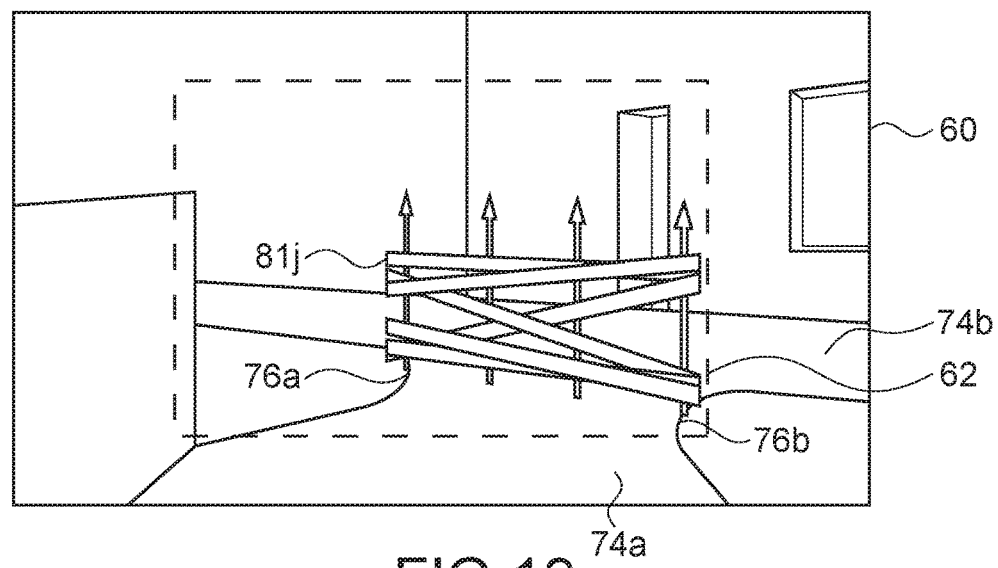
FIG. 19 A schematic diagram showing a display example of the blocking object.

In FIG. 19, a blocking object 81*j* is displayed at a position (three-forked road) at which a sidewalk 74*a* on which the user 1 walks junctions to sidewalk 74*b*. The display position of the blocking object 81*j* is calculated using boundary portions 76*a* and 76*b* of the sidewalk 74 at the three-forked road as references for example. With this configuration, a scene that looks as if the sidewalk 74*a* on which the user 1 walks was shielded in the middle can be made. As a result, entry of the user 1 into the other sidewalk 74*b* can be naturally limited.

Figure 20:
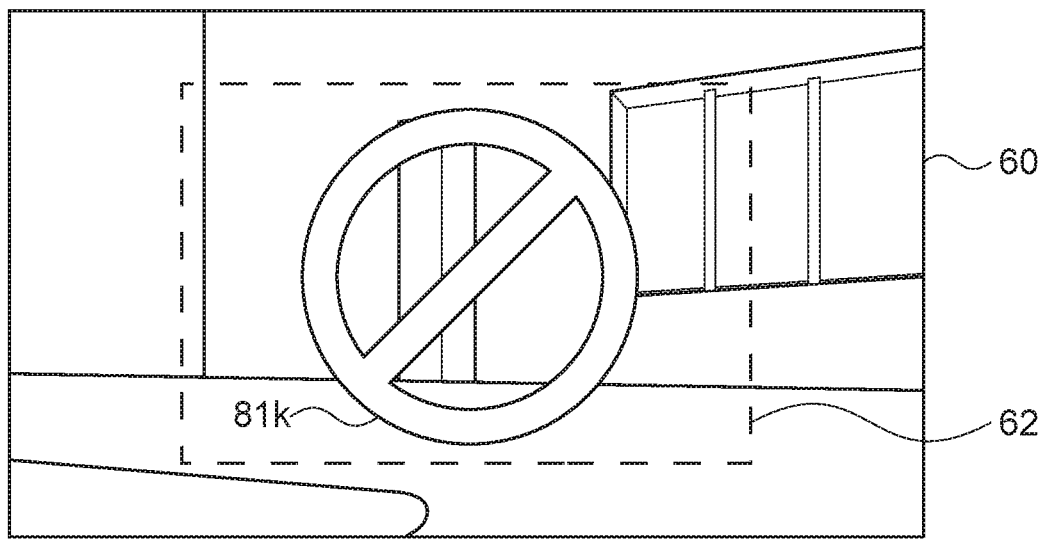
FIG. 20 A schematic diagram showing a display example of the blocking object.

In FIG. 20, the user 1 approaches the three-forked road shown in FIG. 19. That is, the user 1 approaches the position at which the blocking object 81*j* is displayed in FIG. 19. In this case, the blocking object 81*j* may not fall within the angle-of-view 62 of the see-through display 12 (see FIG. 21). In such a case, as shown in FIG. 20, a blocking object 81*k* that falls within the angle-of-view 62 is displayed instead of the blocking object 81*j*.

The blocking object 81*k* is displayed on the screen in accordance with approach of the user 1 to the three-forked road for example. At this time, the blocking object 81*j* shown in FIG. 19 is not displayed anymore in accordance with approach of the user 1 to the three-forked road. Processing of switching to display of the other blocking object 81*k* when the blocking object 81*j* departs from the angle-of-view 62 in this manner may be executed. With this configuration, the situation where the blocking object 81 unnaturally cut off is displayed is avoided, and appropriate display can be continued.

Hereinabove, with the controller 50 according to this embodiment, the limitation region 63 where entry is limited is set and the display of the blocking object 81 that is the virtual object 80 that blocks entry into that limitation region 63 is controlled. The display control on the blocking object 81 is executed on the basis of the display area 61 in which the virtual object 80 can be displayed. With this configuration, it is possible to appropriately display the blocking object 81 and natural virtual experience can be provided.

With the configuration to display the virtual image or the like in the visual field of the user, the size of the visual field of the user may be different from the size of the display screen on which the virtual image or the like is displayed. For example, when the display screen is smaller than the visual field of the user, there is a possibility that the situation where the virtual image is unnaturally cut off at the end of the display screen may occur.

Figure 21:
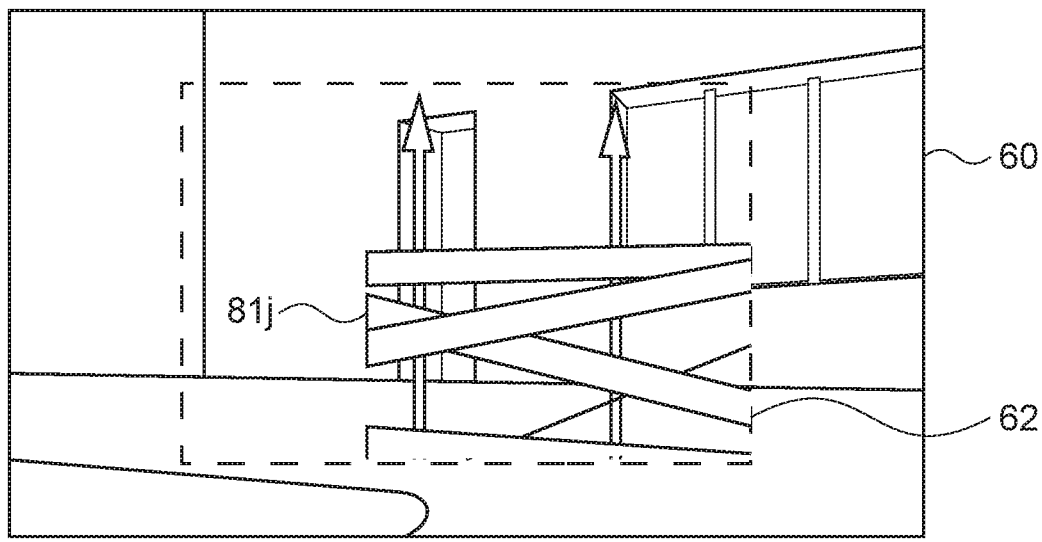
FIG. 21 A schematic diagram showing a display example of a blocking object shown as a comparative example.

FIG. 21 is a schematic diagram showing a display example of the blocking object 81 shown as a comparative example. In FIG. 21, the user 1 approaches the three-forked road with the display of the blocking object 81*j* shown in FIG. 19 continued. As the user 1 approaches the three-forked road, the display size of the blocking object 81*j* increases. As a result, the blocking object 81*j* departs from the angle-of-view 62 of the see-through display 12 (display area 61) and is unnaturally cut off at the edge of the see-through display 12. Therefore, it becomes difficult to grasp the displayed contents or there is a possibility that a problem in that the field-of-view is shielded may arise.

Moreover, a method of displaying the virtual image of an arrow, a character, or the like to thereby directly display the route to the destination is envisaged as a method of guiding the user who enjoys virtual experience. In such a guide method, the user moves in accordance with the arrow (or moves in accordance with instructions from the character). Moreover, it is conceivable that various types of information such as a distance and a direction to a destination and an arrival time are displayed for guiding the user.

Figure 22:
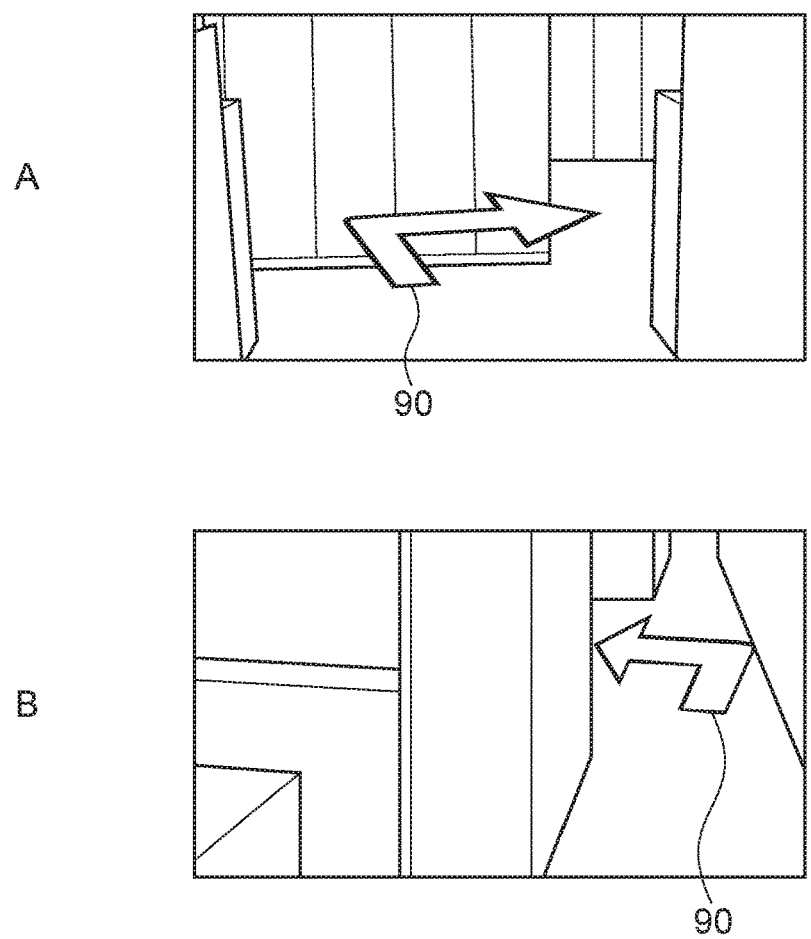
FIG. 22 Schematic diagrams each showing a display example of an arrow image shown as a comparative example.
Figure 23:
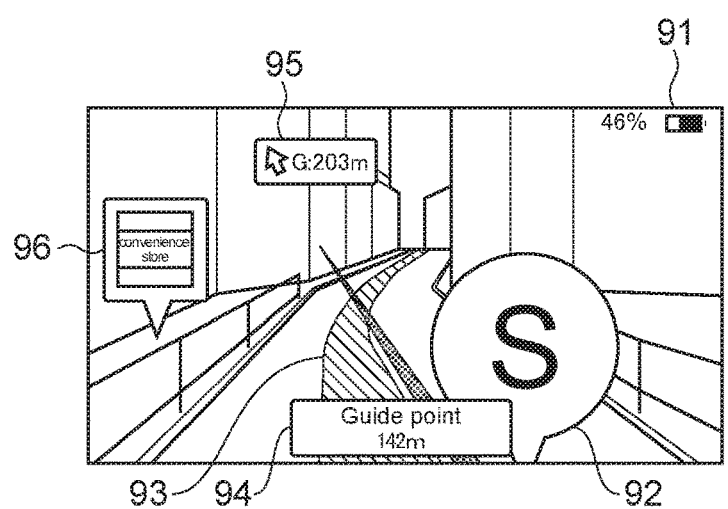
FIG. 23 A schematic diagram showing a display example of a guide screen shown as a comparative example.

FIG. 22 is a schematic diagram showing a display example of an arrow image shown as a comparative example. FIG. 23 is a schematic diagram showing a display example of a guide screen shown as a comparative example.

When the arrow image indicating a right turn is displayed as shown in A of FIG. 22, it is envisaged that the user concentrates moving (turning to the right) in accordance with an arrow image 90. Moreover, when an arrow image 90 indicating a left turn is displayed as shown in B of FIG. 22, it is envisaged that the user concentrates turning to the left. When the route for the user is directly displayed with the arrow image 90 or the like in this manner, the user acts while concentrating the task of following the arrow (doing it as a task) and there is a possibility that it may be difficult to simultaneously do tasks other than the movement.

Moreover, on a guide screen 91 shown in FIG. 23, virtual images indicating a guide start point 92, a user's route 93, a distance 94 or direction 95 to the destination, near store information 96, and the like are displayed. As the number of virtual images displayed in the field-of-view increases in this manner, the field-of-view of the real world is narrower and the user's action can be interfere with. Moreover, the narrower field-of-view of the real world makes it difficult to avoid predicted danger and the like in advance and a possibility that the risk of accident and the like may increase.

In the HMD 100 according to this embodiment, the blocking object 81 that blocks entry into the limitation region 63 is displayed on the basis of the angle-of-view 62 of the see-through display 12, i.e., the display area 61 of the virtual object 80. Specifically, the blocking object 81 is displayed to fall within the display area 61 as appropriate. As a result, it becomes possible to appropriately display the entire blocking object 81 and to sufficiently avoid the situation where the display is unnaturally interrupted. Moreover, since the entire blocking object 81 is displayed, it becomes possible to correctly inform of the presence of the limitation region 63 and the like.

Moreover, the blocking object 81 is displayed using the actual object 70 as a reference. With this configuration, the blocking object 81 or the like is displayed at a natural position and with a natural size in the visual field area 60 of the user 1 so as to be adapted for the environment of the actual space. As a result, the user 1 can be provided with natural virtual experience.

Moreover, the blocking object 81 can be used for informing the user 1 of the presence of the limitation region 63 where entry is limited. That is, the user 1 can be made to naturally perceive the boundary of the area (play area) in which the user 1 can act. As a result, for example, the user 1 is enabled to select an action of freely moving the play area, and virtual experience having a high degree of freedom can be provided without interfering with spontaneous action of the user 1.

The display of the blocking object 81 is controlled in accordance with the position and movement direction of the user 1. With this configuration, for example, the user 1 can be naturally guided to the destination 44. Moreover, by performing the display of the blocking object 81 on the limitation region 63 surrounding the user 1, the number of the blocking objects 81 displayed can be reduced. As a result, the user 1 can be safely guided to the destination without covering the field-of-view of the user 1.

Other Embodiments

The present technology is not limited to the above-mentioned embodiment and various other embodiments can be made.

In the above-mentioned embodiment, the information regarding the actual objects associated with the limitation region is acquired by reading the three-dimensional model of the actual object or the like recorded in the map data. The present technology is not limited thereto, and the information regarding the actual objects may be acquired on the basis of the image of the actual space or the like taken with the outward-facing camera or the like. In this case, the actual object included in the angle-of-view can be detected by using a technology or the like capable of object detection such as pattern matching.

Moreover, a distance sensor or the like that measures a distance to the actual object that exists in the actual space may be used as the sensor that detects the information regarding the actual space. An arbitrary sensor such as a stereo camera, a time of flight (TOF) sensor, a laser imaging detection and ranging (LiDAR) sensor, and a laser range finder may be used as the distance sensor. The information regarding the actual objects can be read while generating the map data by executing user's self-position estimation and surrounding map generation (SLAM) on the basis of those pieces of information regarding the distance sensor.

Hereinabove, the blocking object is displayed using the actual object that exists in the actual space as a reference. The present technology is not limited thereto, and processing of displaying the blocking object at an arbitrary position in the actual space for example may be executed. For example, processing of specifying the coordinates (latitude, longitude, and height) and the like of an arbitrary point in the actual space included in the display area on the see-through display or the like and displaying the blocking object at that point may be executed. With this configuration, the display position or the like of the blocking object can be easily calculated and the processing speed can be enhanced.

In the above-mentioned embodiment, the virtual experience using the augmented reality (AR) is provided through the HMD (AR glasses) including the see-through displays. The present technology is not limited thereto, and the present technology can also be applied to an immersive HMD or the like that realizes AR display by displaying an image of the actual space taken with an outward-facing camera or the like for example. In this case, the angle-of-view (angle-of-view of the outward-facing camera) of the image captured by a display apparatus installed in the immersive HMD is the display area in which the virtual object can be displayed.

Moreover, the present technology is not limited to a device such as the HMD mounted on the user's head, and AR display may be realized through a smartphone, a tablet terminal, a personal computer (PC), or the like for example. In this case, processing of controlling the display of the blocking object to fall within the angle-of-view of the camera installed in the smartphone or the like is executed for example. With this configuration, natural AR experience can be provided. Moreover, the present technology is not limited to the AR, and the present technology can also be applied to a case where virtual experience using the virtual reality (VR), mixed reality, or the like is provided for example.

Hereinabove, the HMD that is the image display apparatus has been exemplified as the embodiment of the information processing apparatus according to the present technology. However, the information processing apparatus according to the present technology may be realized by an arbitrary computer that is configured to be separate from the HMD and connected to the HMD with a wire or wirelessly. For example, the information processing method according to the present technology may be executed by a cloud server. Alternatively, the information processing method according to the present technology may be executed by cooperation of the HMD and another computer.

That is, the information processing method and the program according to the present technology can be executed only in a computer system constituted by a single computer but also in a computer system in which a plurality of computers operate together. It should be noted that in the present disclosure, the system means collection of a plurality of components (apparatuses, modules (parts), and the like). It does not matter whether or not all the components are housed in the same casing. Therefore, a plurality of apparatuses housed in separate casings and connected to one another via a network and a single apparatus having a plurality of modules housed in a single casing are both systems.

The execution of the information processing method and the program according to the present technology by the computer system includes, for example, both of a case where setting of the limitation region, control of the display of the blocking object based on the display area, and the like are executed by a single computer and a case where the respective types of processing are executed by different computers. Moreover, the execution of each of the types of processing by a predetermined computer includes causing other computers to execute some or all of those types of processing and acquiring results thereof.

That is, the information processing method and the program according to the present technology are also applicable to a configuration of cloud computing in which a plurality of apparatuses shares and processes a single function together via a network.

At least two feature portions of the feature portions according to the present technology described above can also be combined. That is, the various feature portions described in the respective embodiments may be arbitrarily combined across the respective embodiments. Moreover, various effects described above are merely examples and are not limited, and other effects may be exerted.

It should be noted that the present technology can also take configurations as follows.

(1) An information processing apparatus, including:
a setting unit that sets a limitation region in which entry is limited; and
a display control unit that controls display of a blocking object that is a virtual object that blocks entry into the limitation region on the basis of a display area in which the virtual object is capable of being displayed.

(2) The information processing apparatus according to (1), in which
the display control unit controls the display of the blocking object such that the blocking object falls within the display area.

(3) The information processing apparatus according to (1) or (2), further including
an acquisition unit that acquires information regarding a predetermined target object associated with the limitation region, in which
the display control unit controls the display of the blocking object, using the predetermined target object as a reference.

(4) The information processing apparatus according to (3), in which
the display control unit adjusts at least one of a display position or a display size of the blocking object with respect to the predetermined target object on the basis of the display area.

(5) The information processing apparatus according to (3) or (4), in which
the display control unit generates a candidate of the blocking object using the predetermined target object as a reference and determines whether or not to display the candidate of the blocking object on the basis of the display area.

(6) The information processing apparatus according to (5), in which
the display control unit determines whether or not to display the candidate of the blocking object by determining whether or not the candidate of the blocking object falls within the display area.

(7) The information processing apparatus according to any one of (3) to (6), in which
the acquisition unit is capable of acquiring information regarding each of a first target object and a second target object spaced apart from each other as the information regarding the predetermined target object, and
the display control unit displays the blocking object between the first and second target objects.

(8) The information processing apparatus according to any one of (3) to (7), in which
the display control unit displays the blocking object such that the blocking object overlaps the predetermined target object.

(9) The information processing apparatus according to any one of (1) to (8), further including a calculation unit that calculates an angle-of-view of a display unit on which the virtual object is displayed as the display area.

(10) The information processing apparatus according to (9), in which
the display unit is provided in a head mounted display (HMD) that is mounted on a head of a user, and
the calculation unit calculates the angle-of-view of the display unit on the basis of at least one of a position or an attitude of the head of the user.

(11) The information processing apparatus according to (9) or (10), in which
the display unit includes a see-through display.

(12) The information processing apparatus according to any one of (1) to (11), in which
the display control unit displays the blocking object in accordance with at least one of a position or a movement direction of a user.

(13) The information processing apparatus according to (12), in which
the display control unit displays the blocking object that limits entry into the limitation region surrounding the user.

(14) The information processing apparatus according to any one of (1) to (13), in which
the setting unit sets the limitation region on the basis of at least one of a position or a destination of a user.

(15) The information processing apparatus according to any one of (1) to (14), in which
the setting unit is capable of setting a limitation level representing a level of limitation on entry into the limitation region, and
the display control unit controls the display of the blocking object in accordance with the limitation level.

(16) The information processing apparatus according to any one of (1) to (15), further including
a warning unit that generates warning information for warning of at least one of entry into or approach to the limitation region.

(17) The information processing apparatus according to (16), in which
the warning information includes at least one of sound information, display information, or vibration information.

(18) An information processing method, including:
by a computer system,
setting a limitation region in which entry is limited; and
controlling display of a blocking object that is a virtual object that blocks entry into the limitation region on the basis of a display area in which the virtual object is capable of being displayed.

(19) A program that causes a computer system to execute:
a step of setting a limitation region in which entry is limited; and
a step of controlling display of a blocking object that is a virtual object that blocks entry into the limitation region on the basis of a display area in which the virtual object is capable of being displayed.

REFERENCE SIGNS LIST 1 user
12 see-through display
41 map data
42 control program
50 controller
51 information acquisition unit
52 region setting unit
53 entry determination unit 54 display area calculation unit
55 lay-out planning unit
56 lay-out determination unit
57 output control unit
58 warning unit
60 visual field area
61 display area
62 angle-of-view
63 limitation region
70 actual object
80 virtual object
81, 81a to 81k blocking object
100 HMD

The invention claimed is:

1. An information processing apparatus, comprising:
a setting unit configured to set a limitation region in which entry is limited;
a display control unit configured to control display of a blocking object that is a virtual object that blocks entry into the limitation region on a basis of a display area in which the virtual object is capable of being displayed; and
a calculation unit configured to calculate an angle-of-view of a display unit on which the virtual object is displayed as the display area, wherein
the display control unit is further configured to
determine whether a size of the blocking object and a size of another blocking object fall within the angle-of-view,
control display of the blocking object and the another blocking object based on the size of the blocking object and the size of the another blocking object failing within the angle-of-view,
determine whether the blocking object overlaps with the another blocking object, and
hide one of the blocking object or the another blocking object based on the determination that the blocking object overlaps with the another blocking object, and
the setting unit, the display control unit, and the calculation unit are each implemented via at least one processor.

2. The information processing apparatus according to claim 1, wherein
the display control unit is further configured to control the display of the blocking object such that the blocking object falls within the display area.

3. The information processing apparatus according to claim 1, further comprising
an acquisition unit configured to acquire information regarding a predetermined target object associated with the limitation region, wherein
the display control unit is further configured to control the display of the blocking object, using the predetermined target object as a reference, and
the acquisition unit is implemented via at least one processor.

4. The information processing apparatus according to claim 3, wherein
the display control unit is further configured to adjust at least one of a display position or a display size of the blocking object with respect to the predetermined target object on a basis of the display area.

5. The information processing apparatus according to claim 3, wherein
the display control unit is further configured to generate a candidate of the blocking object using the predetermined target object as a reference and determine whether or not to display the candidate of the blocking object on a basis of the display area.

6. The information processing apparatus according to claim 5, wherein
the display control unit is further configured to determine whether or not to display the candidate of the blocking object by determining whether or not the candidate of the blocking object falls within the display area.

7. The information processing apparatus according to claim 3, wherein
the acquisition unit is further configured to acquire information regarding each of a first target object and a second target object spaced apart from each other as the information regarding the predetermined target object, and
the display control unit is further configured to display the blocking object between the first and second target objects.

8. The information processing apparatus according to claim 3, wherein
the display control unit is further configured to display the blocking object such that the blocking object overlaps the predetermined target object.

9. The information processing apparatus according to claim 1, wherein
the display unit is provided in a head mounted display (HMD) that is mounted on a head of a user, and
the calculation unit is further configured to calculate the angle-of-view of the display unit on a basis of at least one of a position or an attitude of the head of the user.

10. The information processing apparatus according to claim 1, wherein
the display unit comprises a see-through display.

11. The information processing apparatus according to claim 1, wherein
the display control unit is further configured to display the blocking object in accordance with at least one of a position or a movement direction of a user.

12. The information processing apparatus according to claim 11, wherein
the display control unit is further configured to display the blocking object that limits entry into the limitation region surrounding the user.

13. The information processing apparatus according to claim 1, wherein
the setting unit is further configured to set the limitation region on a basis of at least one of a position or a destination of a user.

14. The information processing apparatus according to claim 1, wherein
the setting unit is further configured to set a limitation level representing a level of limitation on entry into the limitation region, and
the display control unit is further configured to control the display of the blocking object in accordance with the limitation level.

15. The information processing apparatus according to claim 1, further comprising
a warning unit configured to generate warning information for warning of at least one of entry into or approach to the limitation region,
wherein the warning unit is implemented via at least one processor.

16. The information processing apparatus according to claim 15, wherein the warning information includes at least one of sound information, display information, or vibration information.

17. An information processing method, comprising:
by a computer system,
setting a limitation region in which entry is limited;
controlling display of a blocking object that is a virtual object that blocks entry into the limitation region on a basis of a display area in which the virtual object is capable of being displayed;
calculating an angle-of-view of a display unit on which the virtual object is displayed as the display area;
determining whether a size of the blocking object and a size of another blocking object fall within the angle-of-view;
controlling display of the blocking object and the another blocking object based on the size of the blocking object and the size of the another blocking object failing within the angle-of-view;
determining whether the blocking object overlaps with the another blocking object; and
hiding one of the blocking object or the another blocking object based on the determination that the blocking object overlaps with the another blocking object.

18. A non-transitory computer-readable medium having embodied thereon a program, which when executed by a computer causes the computer to execute an information processing method, the method comprising:
setting a limitation region in which entry is limited;
controlling display of a blocking object that is a virtual object that blocks entry into the limitation region on a basis of a display area in which the virtual object is capable of being displayed;
calculating an angle-of-view of a display unit on which the virtual object is displayed as the display area;
determining whether a size of the blocking object and a size of another blocking object fall within the angle-of-view;
controlling display of the blocking object and the another blocking object based on the size of the blocking object and the size of the another blocking object failing within the angle-of-view;
determining whether the blocking object overlaps with the another blocking object; and
hiding one of the blocking object or the another blocking object based on the determination that the blocking object overlaps with the another blocking object.

* * * * *